United States Patent
Higuchi et al.

(10) Patent No.: US 9,348,396 B2
(45) Date of Patent: May 24, 2016

(54) COMPUTER SYSTEM, CONNECTION DEVICE, POWER SUPPLY CONTROL METHOD, AND POWER SUPPLY CONTROL PROGRAM RECORDING MEDIUM

(75) Inventors: Junichi Higuchi, Tokyo (JP); Youichi Hidaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 188 days.

(21) Appl. No.: 14/124,309

(22) PCT Filed: Jun. 8, 2012

(86) PCT No.: PCT/JP2012/064848
§ 371 (c)(1),
(2), (4) Date: Dec. 6, 2013

(87) PCT Pub. No.: WO2012/169637
PCT Pub. Date: Dec. 13, 2012

(65) Prior Publication Data
US 2014/0115359 A1 Apr. 24, 2014

(30) Foreign Application Priority Data
Jun. 8, 2011 (JP) .................................. 2011-128685

(51) Int. Cl.
*G06F 1/32* (2006.01)
(52) U.S. Cl.
CPC ............ *G06F 1/3206* (2013.01); *G06F 1/3209* (2013.01); *G06F 1/3278* (2013.01); *Y02B 60/126* (2013.01)
(58) Field of Classification Search
CPC ....... G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS 7,725,632 B2 * 5/2010 Baba .................... G06F 13/4022 370/408
8,793,424 B2 * 7/2014 Miyoshi .............. G06F 13/4022 710/311

(Continued)

FOREIGN PATENT DOCUMENTS

JP H10262048 A 9/1998
JP 2000-293272 A 10/2000

(Continued)

OTHER PUBLICATIONS

Youichi Hidaka et al., "ExpressEther—Ethernet-Based Virtualization Technology for Reconfigurable Hardware Platformm, (1) System Overview and Architechture", B-6-57, IEICE Communications Society Conference 2006, 2006 pp. 57. See cited document (Non Patent Literature 1) on p. 2, paragraph [0006] of translated the Applicant's Specification for explanation of relevence.

(Continued)

*Primary Examiner* — Zahid Choudhury

(57) ABSTRACT

A host monitoring unit in a host connection device (301) detects a change in a connection status between a host device (101) and the host connection device (301) based on a change in power status of the host device (101), and notifies a host connection controller. The host connection controller notifies an I/O connection controller in an I/O connection device (401) connected with an I/O device (201) having a power linking permitted of the change in the connection status, and sets or cancels an interconnection. After the completion of the setting or cancellation of the interconnection, the I/O connection controller notifies an I/O power supply controller of the change in the connection status, and the I/O power supply controller controls an I/O power supply (20).

9 Claims, 14 Drawing Sheets

(56) References Cited

U.S. PATENT DOCUMENTS

| | | | |
|---|---|---|---|
| 2006/0239287 A1* | 10/2006 | Johnsen | H04L 45/566 370/412 |
| 2009/0187694 A1* | 7/2009 | Baba | G06F 13/4022 710/316 |
| 2009/0198862 A1* | 8/2009 | Okitsu | G06F 9/5088 710/316 |
| 2009/0265501 A1 | 10/2009 | Uehara et al. | |
| 2010/0077121 A1* | 3/2010 | Lai | G06F 13/385 710/301 |
| 2012/0151102 A1* | 6/2012 | Cheng | G06F 9/4411 710/19 |

FOREIGN PATENT DOCUMENTS

| | | |
|---|---|---|
| JP | 2001134346 A | 5/2001 |
| JP | 2003029883 A | 1/2003 |
| JP | 2003280770 A | 10/2003 |
| JP | 2009116503 A | 5/2009 |
| JP | 2009157840 A | 7/2009 |
| JP | 2009-258978 A | 11/2009 |
| JP | 2010-146175 A | 7/2010 |
| JP | 2010-191814 A | 9/2010 |
| JP | 2011-10043 A | 1/2011 |
| JP | 2011-28782 A | 2/2011 |
| JP | 2011-81622 A | 4/2011 |
| WO | 2011/004548 A1 | 1/2011 |

OTHER PUBLICATIONS

Jun Szuzki et al., "ExpressEther—Ethernet-Based Virtualization Technology for Reconfigurable Hardware Platform, (2) I/O Virtualization Technology", B-6-58, IEICE Communications Society Conference 2006, 2006, pp. 58. See cited document (Non Patent Literature 2) on p. 2, paragraph [0006] of translated the Applicant's Specification for explanation of relevance.

International Search Report for PCT Application No. PCT/JP2012/064848, mailed on Aug. 21, 2012.

Extended European Search Report of No. EP12797360.0 dated Jan. 28, 2015.

Japanese Office Action for JP Application No. 2013-519552 mailed on Dec. 2, 2015 with English Translation.

* cited by examiner

| POWER-LINKING PERMITTED DEVICE | POWER STATUS |
|---|---|
| I/O DEVICE 202 | OFF |
| I/O DEVICE 203 | OFF |
| I/O DEVICE 204 | OFF |

COMPUTER SYSTEM, CONNECTION DEVICE, POWER SUPPLY CONTROL METHOD, AND POWER SUPPLY CONTROL PROGRAM RECORDING MEDIUM

This application is a National Stage Entry of PCT/JP2012/128685 filed on Jun. 8, 2012, which claims priority from Japanese Patent Application 2011-128685 filed on Jun. 8, 2011, the contents of all of which are incorporated herein by reference, in their entirety.

TECHNICAL FIELD

The present invention relates to a computer system, a connecting device, a power supply control method, and a recording medium of a power supply control program.

BACKGROUND ART

In recent years, various virtual technologies for various apparatuses like a computer are developed from the standpoint of a fail-safe and an effective operation of resources.

Patent Literature 1 discloses a virtual switch for a computer system which enables a switching from a current system to a standby system. Patent Literature 2 discloses an I/O virtualization technology that enables multiple computers to share an I/O device. Patent Literature 3 discloses a virtual switch that enables multiple computers to share an I/O device while suppressing an increase of a resource by a switch. Non Patent Literatures 1 and 2 disclose a system virtualization technology ExpEther that is a virtualization technology which realizes an effective operation of resources and which utilizes Ethernet (registered trademark) having a function of PCI Express (registered trademark, hereinafter, referred to as PCIe) expanded.

Moreover, various technologies that enable an operation of a device in an energy-saving manner are developed. Patent Literature 4 discloses a packet relaying device which sets the local device to be in an energy-saving mode based on a linked status, and which instructs another packet relaying device to operate in an energy-saving mode. Patent Literature 5 discloses an information processing device that is capable of accomplishing both energy-saving operation based on a linked status, and performance.

CITATION LIST

Patent Literature

Patent Literature 1: Unexamined Japanese Patent Application Kokai Publication No. 2009-258978
Patent Literature 2: Unexamined Japanese Patent Application Kokai Publication No. 2010-146175
Patent Literature 3: Unexamined Japanese Patent Application Kokai Publication No. 2010-191814
Patent Literature 4: Unexamined Japanese Patent Application Kokai Publication No. 2011-010043
Patent Literature 5: Unexamined Japanese Patent Application Kokai Publication No. 2011-028782

Non Patent Literature

Non Patent Literature 1: Institute of Electronics, Information and Communication Engineers, Conference of Year 2006, B-6-57, "Proposal (1) of System Virtualization Technology ExpressEther Using Ethernet: System Outline and Architecture"

Non Patent Literature 2: Institute of Electronics, Information and Communication Engineers, Conference of Year 2006, B-6-58, "Proposal (2) of System Virtualization Technology ExpressEther Using Ethernet: I/O Virtualization Technology"

SUMMARY OF INVENTION

Technical Problem

According to a computer system having at least one CPU device with a CPU, a memory and a chipset, and at least one peripheral device with at least one graphic card, sound card, interface card, and the like connected together over a network through a connection device, the CPU devices and the peripheral devices are not retained in the same casing, and are located at remote locations in some cases. Hence, it is necessary to dispose respective power supplies to the CPU devices and the peripheral devices, and to supply respective powers to the CPU devices and the peripheral devices from the respective power supplies.

When all CPU devices and peripheral devices are present in the same casing, or when it is possible to supply power from a common power supply, the power is shut off to suppress a power consumption when no computer system is subjected to an operation. In the case of a computer system having respective power supplies disposed for the CPU devices and the peripheral devices, in order to ensure that the computer system is always operated with all CPU devices and peripheral devices being available, it is necessary to always supply power to the CPU devices and the peripheral devices from the respective power supplies. Hence, the power consumption of the computer system having respective power supplies disposed for the CPU devices and the peripheral devices is large in comparison with the power consumption of the computer system having all CPU devices and peripheral devices present in the same casing or the power consumption of the computer system having all CPU devices and peripheral devices supplied with power from the common power supply. A first task is to suppress such a power consumption.

According to the computer system having the respective power supplies for the CPU devices and the peripheral devices, a condition may occur in which no power is supplied to some CPU devices and peripheral devices, for example, power is supplied to a CPU device but no power is supplied to some peripheral devices like a sound card. That is, a computer system may operate with an incomplete system configuration in which some CPU devices and peripheral devices are unavailable. A second task is to prevent a computer system from operating with such an incomplete system configuration.

The present invention has been made in view of the above-explained circumstances, and it is an objective of the present invention to provide a computer system, a connection device, a power supply control method, and a recording medium of a power supply control program which suppress a power consumption of a computer system having CPU devices and peripheral devices provided with respective power supplies and connected together over a network through the connection device and which prevent the computer system from operating with an incomplete system configuration in which no power is supplied to some CPU devices and peripheral devices.

Solution to Problem

To accomplish the above objective, a first aspect of the present invention provides a connection device which is connected with a host device including a CPU device and an individual power supply, or an I/O device including a peripheral device and an individual power supply via a system bus, and which connects the host device or the I/O device to a network, the connection device including: connection status monitoring means that detects a change in a connection status of the system bus connected with the host device or the I/O device; connection status notifying means that notifies another connection device connected with the network and set in advance of the change in the connection status of the system bus detected by the connection status monitoring means; interconnection control means that sets or cancels an interconnection with the another connection device set in advance based on the change in the connection status of the system bus detected by the connection status monitoring means; transfer process means that enables a virtual system bus transfer of data in the system bus connected with the host device or the I/O device transferred over the network with the interconnection set with the another connection device by the interconnection control means being as a virtual system bus; and power supply control means that changes ON/OFF states of the power supply of the connected host device or I/O device when receiving the notification from the another connection device of the change in the connection status of the system bus.

A second aspect of the present invention provides a computer system including: the at least one host device; the at least one I/O device; and the equal to or greater than two connection devices of the first aspect each of which is connected with the host device and the I/O device via the system bus, and connects each of the host device and the I/O device to the network.

A third aspect of the present invention provides a power supply control method executed by a connection device which is connected with a host device including a CPU device and an individual power supply, or an I/O device including a peripheral device and an individual power supply via a system bus, and which connects the host device or the I/O device to a network, the power supply control method including: a connection status monitoring step for detecting a change in a connection status of the system bus connected with the host device or the I/O device; a connection status notifying step for notifying another connection device connected with the network and set in advance of the change in the connection status of the system bus detected through the connection status monitoring step; an interconnection control step for setting or canceling an interconnection with the another connection device set in advance based on the change in the connection status of the system bus detected through the connection status monitoring step; a transfer process step for enabling a virtual system bus transfer of data in the system bus connected with the host device or the I/O device transferred over the network with the interconnection set with the another connection device through the interconnection control step being as a virtual system bus; and a power supply control step for changing ON/OFF states of the power supply of the connected host device or I/O device when receiving the notification from the another connection device of the change in the connection status of the system bus.

A fourth aspect of the present invention provides a recording medium of a power supply control program in a computer-readable manner, the power supply control program causing a connection device which is connected with a host device including a CPU device and an individual power supply, or an I/O device including a peripheral device and an individual power supply via a system bus, and which connects the host device or the I/O device to a network to execute: a connection status monitoring step for detecting a change in a connection status of the system bus connected with the host device or the I/O device; a connection status notifying step for notifying another connection device connected with the network and set in advance of the change in the connection status of the system bus detected through the connection status monitoring step; an interconnection control step for setting or canceling an interconnection with the another connection device set in advance based on the change in the connection status of the system bus detected through the connection status monitoring step; a transfer process step for enabling a virtual system bus transfer of data in the system bus connected with the host device or the I/O device transferred over the network with the interconnection set with the another connection device through the interconnection control step being as a virtual system bus; and a power supply control step for changing ON/OFF states of the power supply of the connected host device or I/O device when receiving the notification from the another connection device of the change in the connection status of the system bus.

Advantageous Effects of Invention

According to the present invention, it becomes possible to suppress a power consumption of a computer system having CPU devices and peripheral devices provided with respective power supplies and connected over a network through the connection devices. Moreover, it becomes possible to prevent the computer system from operating with an incomplete system configuration in which no power is supplied to some CPU devices and peripheral devices.

DESCRIPTION OF EMBODIMENTS

Figure 1:
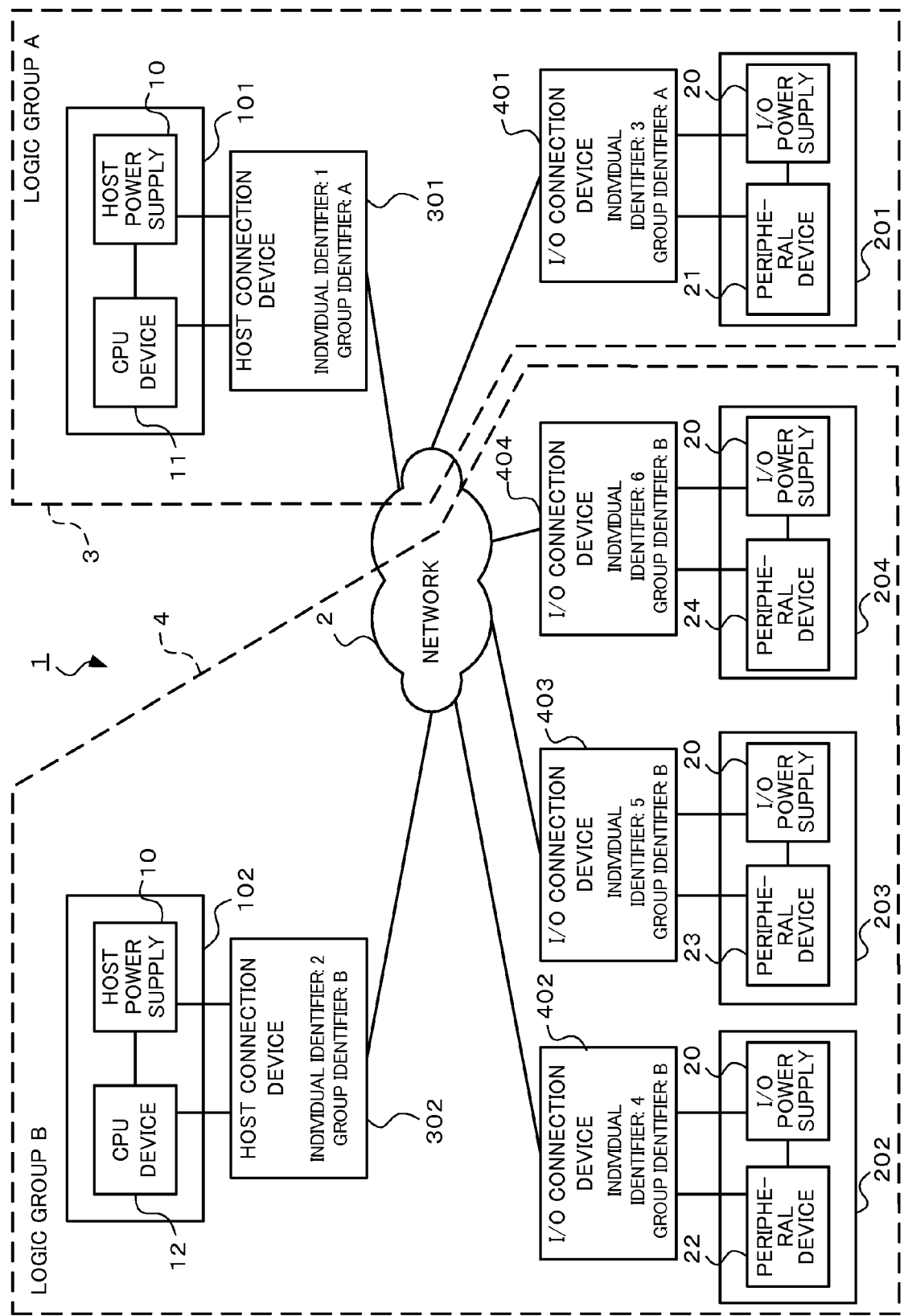
FIG. 1 is a block diagram illustrating an example configuration of a computer system according to a first embodiment of the present invention.

Embodiments of the present invention will be explained in detail with reference to the accompanying drawings. In the figures, the same or equivalent component will be denoted by the same reference numeral.

(First Embodiment) FIG. 1 is a block diagram illustrating an example configuration of a computer system according to a first embodiment of the present invention. A computer system 1 in FIG. 1 includes host devices 101 and 102, I/O devices 201, 202, 203, and 204, host connection devices 301 and 302, and, I/O connection devices 401, 402, 403, and 404. The host devices 101 and 102 are connected with a network 2 via the host connection devices 301 and 302, respectively. The I/O devices 201, 202, 203, and 204 are connected with the network 2 via the I/O connection devices 401, 402, 403, and 404, respectively. The host device 101 and the I/O device 201 configure a logic group A denoted by number 3 in FIG. 1. The host device 102 and the I/O devices 202, 203, and 204 configure a logic group B denoted by number 4 in FIG. 1.

The host connection devices 301 and 302, and the I/O connection devices 401, 402, 403, and 404 are set with respective individual identifiers and group identifiers. The individual identifier is a unique value indicating each connection device in the network 2. The group identifier is a unique value indicating a logic group to which each connection device belongs. The topology of the logic group to which each connection device belongs is a tree-like topology having a host device as a vertex and at least one I/O device is connected with the vertex host device via the network 2.

By changing the group identifier set for each connection device, the logic group to which each connection device belongs is changeable. For example, in accordance with an application of the computer system 1 and a purpose thereof, among equal to or greater than two I/O devices connected with a host device in a logic group, the group identifier of an I/O device is changed and enabled to be connected with a host device in another logic group. That is, a system configuration is freely settable and changeable.

In the example case illustrated in FIG. 1, a group identifier A is set for the host connection device 301 and the I/O connection device 401. In the logic group A denoted by number 3 in FIG. 1, the host device 101 and the I/O device 201 are connected with each other one by one via the host connection device 301 and the I/O connection device 401. Moreover, a group identifier B is set for the host connection device 302 and the I/O connection devices 402, 403, and 404. In the logic group B denoted by number 4 in FIG. 1, the host device 102 and the I/O devices 202, 203, and 204 are connected one another in a manner one by N (where N is a natural number) via the host connection device 302 and the I/O connection devices 402, 403, and 404. It is possible for a logic group to have a further larger number of I/O devices belonged thereto.

The network 2 is for connecting each host device or each I/O device present physically distant from each other via each connection device, and is a network, such as the Internet, a WAN, or a LAN. According to the first embodiment, an example case in which the network 2 is a LAN is explained.

The host devices 101 and 102 each include a host power supply 10. The host devices 101 and 102 include CPU devices 11 and 12, respectively. The respective host power supplies 10 supply power to the CPU devices 11 and 12. The CPU devices 11 and 12 each include at least one CPU, memory, and chipset. The I/O devices 201, 202, 203, and 204 each include an I/O power supply 20. The I/O devices 201, 202, 203, and 204 include respective peripheral devices 21, 22, 23, and 24. The respective I/O power supplies 20 supply power to the peripheral devices 21, 22, 23, and 24. The peripheral devices 21, 22, 23, and 24 each include, for example, a graphic card, a sound card, and/or an interface card.

The host connection devices 301 and 302, and the I/O connection devices 401, 402, 403, and 404 work together to perform an interconnection control and a power supply control on the host devices 101 and 102, and the I/O devices 201, 202, 203, and 204. An explanation below will be given of an interconnection control and a power supply control in the computer system 1 according to the first embodiment. The operation of each host device, that of each host connection device, that of each I/O device, and that of each I/O connection device are respectively the same. The same is true in the later explanation.

Figure 2:
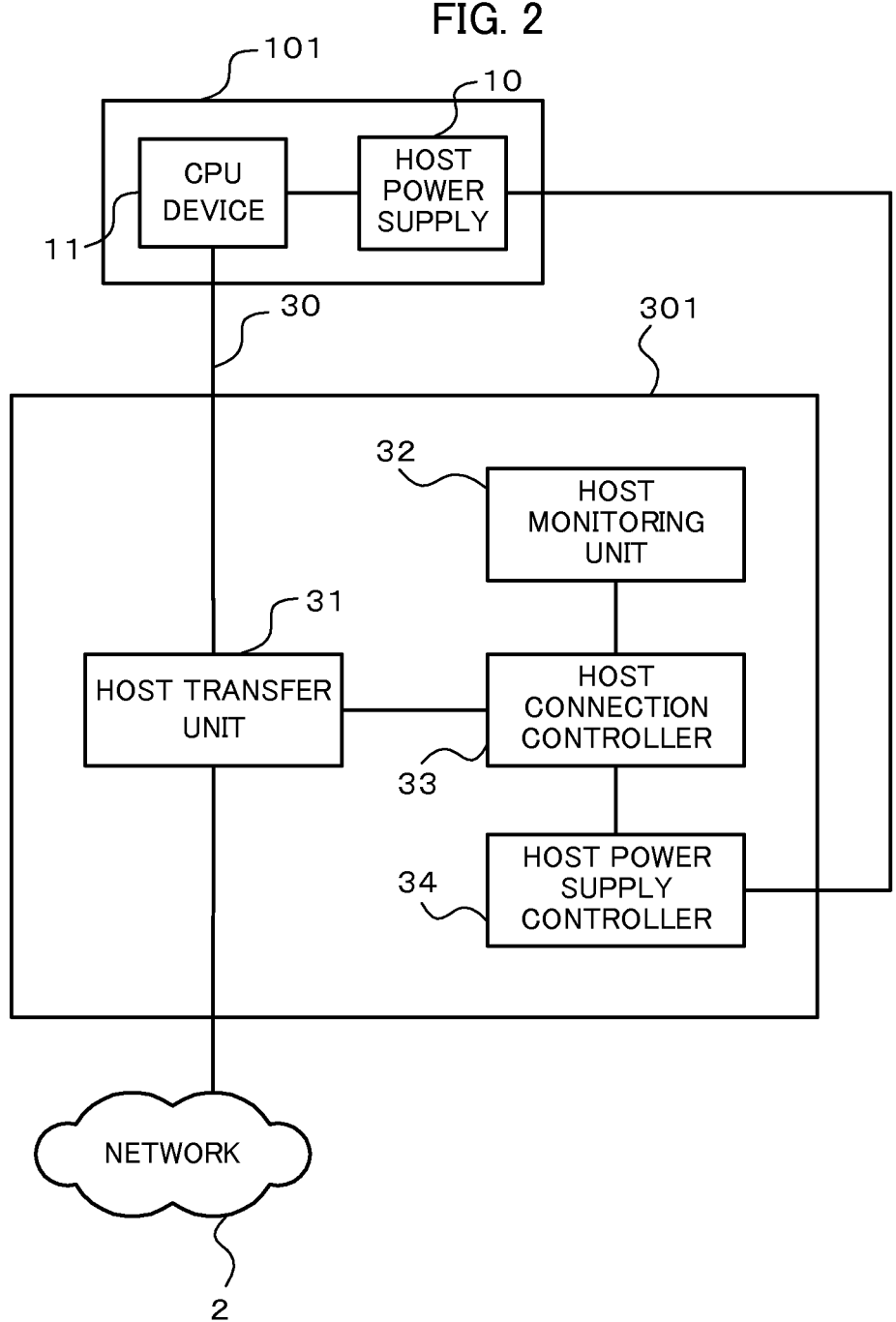
FIG. 2 is a block diagram illustrating an example configuration of a host connection device according to the first embodiment.

FIG. 2 is a block diagram illustrating an example configuration of the host connection device according to the first embodiment. The host connection device 301 includes a host transfer unit 31, a host monitoring unit 32, a host connection controller 33, and a host power supply controller 34. A host connection 30 between the host transfer unit 31 and a CPU device 11 is a system bus. According to the first embodiment, this system bus conforms to a PCIe (registered trademark) standard. The host connection device 302 also employs the same configuration as that of the host connection device 301.

Figures 3, 4:
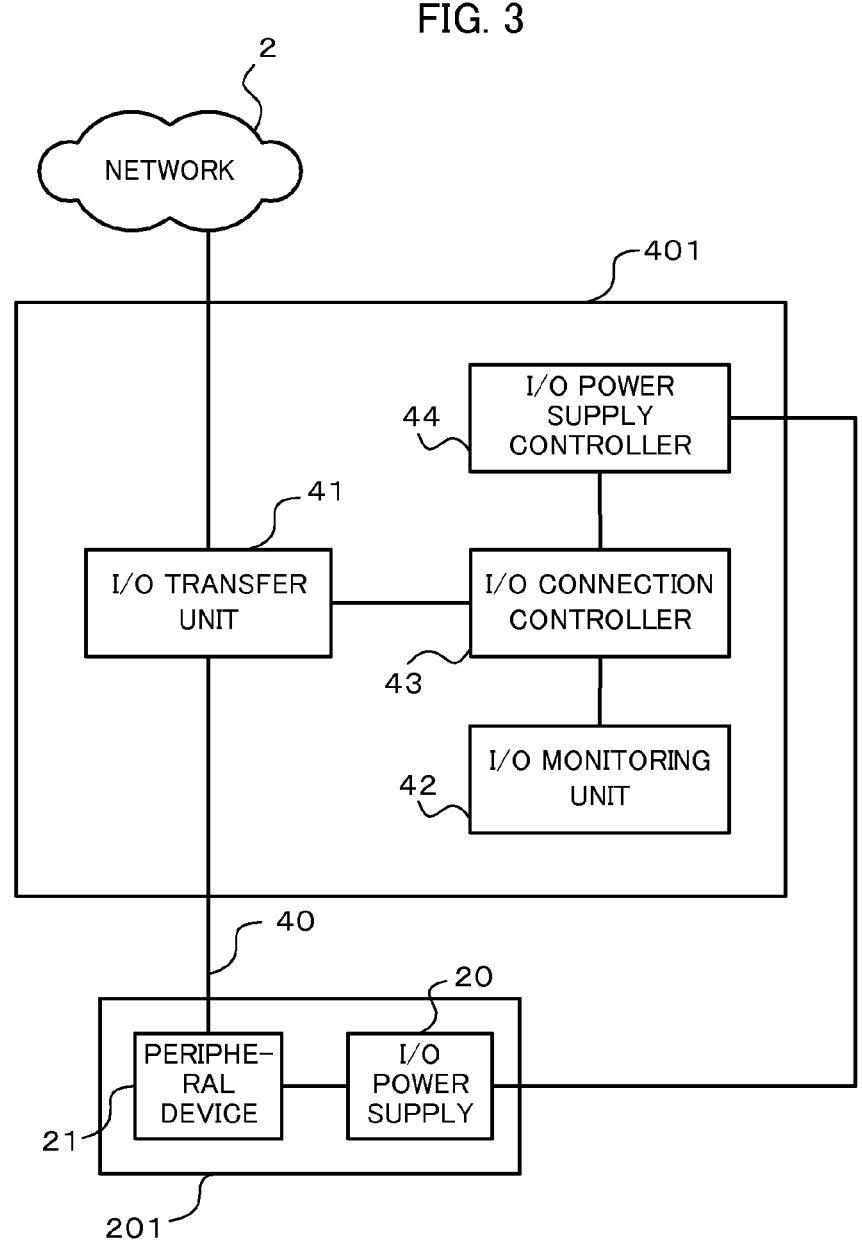
FIG. 3 is a block diagram illustrating an example configuration of an I/O connection device according to the first embodiment.
FIG. 4 is a diagram illustrating an example power status of a power-linking permitted device in the first embodiment.

FIG. 3 is a block diagram illustrating an example configuration of the I/O connection device according to the first embodiment. The I/O connection device 401 includes an I/O transfer unit 41, an I/O monitoring unit 42, an I/O connection controller 43, and an I/O power supply controller 44. An I/O connection 40 between the I/O transfer unit 41 and a peripheral device 21 is a system bus like the host connection 30. The I/O connection devices 402, 403, and 404 employ the same configuration as that of the I/O connection device 401. An explanation will be given of an interconnection control and a power supply control executed by each connection device with reference to FIGS. 2 and 3.

The host transfer unit 31 is connected with the host device 101, the network 2, and the host connection controller 33. The host transfer unit 31 converts packets in the system bus transmitted from the host device 101 into LAN packets so as to be transferred to a destination, and transmits the LAN packets to the network 2. Moreover, the host transfer unit 31 converts LAN packets transmitted from the network 2 into packets compatible in the system bus, and transmits those packets to the host device 101 that is a destination. The host transfer unit 31 converts packets transmitted from the host connection controller 33 as needed so as to be transferred to a destination, and transmits the converted packets to the network 2. Moreover, the host transfer unit 31 converts packets transmitted from the network 2 as needed, and transmits the converted packets to the host connection controller 33 that is a destination. The host transfer unit 31 generates control packets to be used for, for example, an establishment of a connection, a flow control, and a delivery confirmation as needed, transmits such control packets to the network 2 so as to be transferred to the host device 101 or the destination of the packets, or receives control packets from the network 2.

The I/O transfer unit 41 is connected with the I/O device 201, the network 2, and the I/O connection controller 43. The I/O transfer unit 41 performs, like the host transfer unit 31, conversion of packets, transmission and reception thereof, and generation of control packets, and transmission and reception thereof.

When setting for an interconnection between the host connection device 301 and the I/O connection device 401 to be discussed later completes, the host transfer unit 31 and the I/O transfer unit 41 set a virtual system bus. The host transfer unit 31 is set in such a way that the host connection device 301 operates as an upstream port of a virtual switch. The I/O transfer unit 41 is set in such a way that the I/O connection device 401 operates as a downstream port of a virtual switch. The host connection device 301, the I/O connection device 401, and the network 2 operate a virtual switch on the whole, and the host device 101 and the I/O device 201 are connected via a virtual system bus.

The host monitoring unit 32 monitors the connection status of the host connection 30. When the power status of the host device 101 changes, the connection status of the host connection 30 also changes. The host monitoring unit 32 detects a change in the connection status of the host connection 30. The host monitoring unit 32 notifies the host connection controller 33 connected to the host monitoring unit 32 of the detected change in the connection status when detecting the change in the connection status of the host connection 30. Upon reception of this notification, the host connection controller 33 notifies, through the host transfer unit 31, the I/O connection controller 43 of the change in the connection status of the host connection 30, and a setting or a cancellation of an interconnection between the host connection device 301 and the I/O connection device 401, and sets or cancels the interconnection.

When receiving notifications of the change in the connection status of the I/O connection 40 and the setting or cancellation of an interconnection from the I/O connection controller 43, the host connection controller 33 sets or cancels an interconnection with the I/O connection controller 43. When the setting or cancellation of the interconnection between the I/O connection controller 43 and the host connection controller 33 completes, the host connection controller 33 notifies the host power supply controller 34 connected with the host connection controller 33 of a change in the connection status of the I/O connection 40, and the setting or cancellation of the interconnection between the I/O connection controller 43 and the host connection controller 33.

Upon reception of such a notification, the host power supply controller 34 that is connected with the host power supply 10, switches the host power supply 10 between ON and OFF states. That is, when the power status of the I/O device 201 changes to be ON, and the setting for the interconnection between the I/O connection device 401 and the host connection device 301 completes, the host power supply 10 is turned ON. When the power status of the I/O device 201 changes to be OFF, and the cancellation of the interconnection between the I/O connection device 401 and the host connection device 301 completes, the host power supply 10 is turned OFF.

The I/O monitoring unit 42 monitors the connection status of the I/O connection 40. When the power status of the I/O device 201 changes, the connection status of the I/O connection 40 also changes. The I/O monitoring unit 42 detects a change in the connection status of the I/O connection 40. The I/O monitoring unit 42 notifies the I/O connection controller 43 connected with the I/O monitoring unit 42 of the detected change in the connection status when detecting the change in the connection status of the I/O connection 40. The I/O connection controller 43 which has received such a notification notifies, through the I/O transfer unit 41, the host connection controller 33 of the change in the connection status of the I/O connection 40, and the setting or cancellation of the interconnection between the host connection device 301 and the I/O connection device 401, and sets or cancels the interconnection.

When receiving notifications of the change in the connection status of the host connection 30 and the setting or cancellation of the interconnection from the host connection controller 33, the I/O connection controller 43 sets or cancels the interconnection with the host connection controller 33. When the setting or cancelation of the interconnection between the host connection controller 33 and the I/O connection controller 43 completes, the I/O connection controller 43 notifies the I/O power supply controller 44 connected with the I/O connection controller 43 of the change in the connection status of the host connection 30, and the setting or cancellation of the interconnection between the host connection controller 33 and the I/O connection controller 43.

The I/O power supply controller 44 that is connected with the I/O power supply 20 and has received such a notification, switches the I/O power supply 20 between ON and OFF states like the host power supply controller 34.

When the power status of a host device or a I/O device in the computer system 1 changes, each connection device performs the above-explained interconnection control and power supply control to change, in a linked manner, the power status of other each host device or I/O device connected with a host device or I/O device having the power status changed through each connection device, each of the other host devices or I/O devices belonging to the same logic group. Setting is made for the respective connection devices whether or not to permit changing, in a linked manner, the power status of each of the other host devices or I/O devices connected through each of the other connection devices, that is, whether or not to permit a power linking when the power status of each host device or I/O device connected with the connection device changes. Each connection device notifies each connection device connected with each host device or I/O device having a power linking permitted of a change in the connection status of the system bus, and the setting or cancellation of the interconnection between the host connection device 301 and the I/O connection device 401, and sets or cancels the interconnection. Each connection device which has received such a notification changes the power status of each host device or I/O device having the power linking permitted in a linked manner. No notification of the change in the connection status of the system bus and the setting or cancellation of the interconnection between the host connection device 301 and the I/O connection device 401 is made to the connection device connected with each host device or I/O device having the power linking unpermitted.

For example, the host connection device 302 is set in such a way that power linking of the I/O devices 202, 203, and 204 is permitted. When the power status of the host device 102 changes, the host connection device 302 notifies the I/O connection devices 402, 403, and 404 of the change in the connection status of the system bus, and the setting or cancellation of the interconnection, and sets or cancels the interconnection. The I/O connection devices 402, 403, and 404 which have received such a notification switch the respective I/O power supplies 20 in the I/O devices 202, 203, and 204 between ON and OFF states.

When the power status of a host device or I/O device changes based on a change in the power status of the other one host device or I/O device, additionally, the power status of each of the other host devices or I/O devices changes in a linked manner. Setting is made for the respective connection devices whether or not to permit a power linking of further other each host device or I/O device when the power status of each host device or I/O device connected with the other each connection device changes. When the power status of each host device or I/O device connected with each connection device changes based on a change in the power status of each of other host devices or I/O devices, each connection device detects a change in the connection status of the system bus. Next, each connection device notifies each connection device connected with each host device or I/O device having the power linking permitted of the change in the connection status of the system bus, and the setting or cancellation of an interconnection, and sets or cancels the interconnection. Each connection device which has received such a notification changes in a linked manner the power status of each host device or I/O device connected with that connection device, that is, each host device or I/O device having the power linking permitted. No notification of the change in the connection status of the system bus and the setting or cancellation of the interconnection is made to the connection device connected with each host device or I/O device having the power linking unpermitted.

For example, it is presumed that the I/O connection device 402 is set in such a manner as to permit the power linking of the host device 102 and the host connection device 302 is set in such a manner as to permit the power linking of the I/O device 204. When the power status of the I/O device 202 changes, the I/O connection device 402 notifies the host connection device 302 of the change in the connection status of the system bus and the setting or cancellation of the interconnection, and sets or cancels the interconnection. The host connection device 302 switches the host power supply 10 in the host device 102 between ON and OFF states. Moreover, the host connection device 302 notifies the I/O connection device 404 of the change in the connection status of the system bus and the setting or cancellation of the interconnection, and sets or cancels the interconnection. The I/O connection device 404 switches the I/O power supply 20 in the I/O device 204 between ON and OFF states.

A configuration may be employed in which the setting for the permission of the power linking explained above is not made for each connection device but a memory which stores information on the permission for the power linking is provided in the computer system 1, and each connection device refers to this memory.

As explained above, when a connection device is set so as to permit the power linking of multiple host devices or I/O devices as explained above, the connection device performs an interconnection control with each connection device connected with each power-linking permitted device that is each host device or I/O device having the power linking permitted. An explanation will be given of how to repeat the interconnection control.

FIG. 4 is a diagram illustrating an example power status of a power-linking permitted device according to the first embodiment. Each connection device detects the power status of each power-linking permitted device based on whether the interconnection with each connection device connected with each power-linking permitted device is set or canceled. Moreover, each connection device detects the power status of each host device or I/O device connected with each connection device based on the change in the connection status of the system bus. Each connection device repeats the above-explained interconnection control as long as there is a power-linking permitted device in a different power status from that of each host device or I/O device connected with each connection device.

For example, in the example case illustrated in FIG. 4, the host connection device 302 is set so as to permit the power linking of the I/O devices 202, 203, and 204. When the power status of the host device 102 changes to be ON, since the power statuses of all I/O devices 202, 203, and 204 are OFF and are different from the power status of the host device 102, the host connection device 301 firstly performs an interconnection control with an I/O connection device, for example, the I/O connection device 402. Next, when the interconnection setting between the host connection device 302 and the I/O connection device 402 completes, the host connection device 302 estimates that the power status of the I/O device 202 becomes ON. Moreover, the host connection device 301 performs interconnection settings with the I/O connection devices 403 and 404 respectively connected with the I/O devices 203 and 204 in a different power status from that of the host device 102. Each connection device performs an interconnection control with multiple connection devices in this manner.

Figure 5:
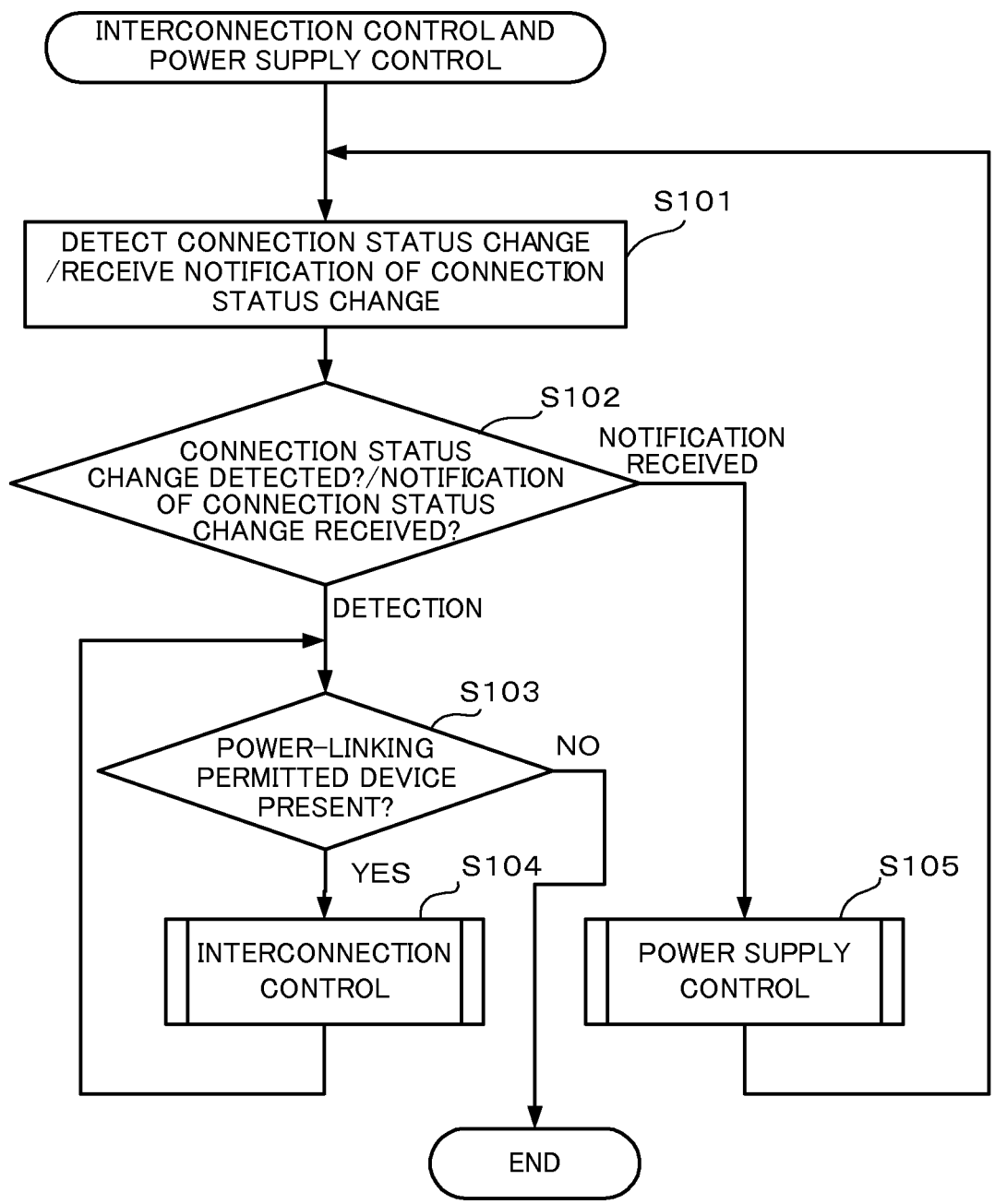
FIG. 5 is a flowchart illustrating an example operation of interconnection control and power supply control to be executed by the connection device according to the first embodiment.

An explanation will be given below of successive operations that, when the power status of a host device or I/O device in the computer system 1 changes, each connection device performs the interconnection control and the power supply control explained with reference to FIGS. 2 and 3, thereby changing the power status of other host device or I/O device in a linked manner. FIG. 5 is a flowchart illustrating example operations of the interconnection control and power supply control to be executed by the connection device according to the first embodiment. The host connection devices 301 and 302, and the I/O connection devices 401, 402, 403, and 404 all operate in accordance with the flowchart of FIG. 5.

(When Host Device and I/O Device are Connected One by One) It is presumed that in the logic group A denoted by number 3 in FIG. 1, the host connection device 301 is set to permit the power linking of the I/O device 201, and an explanation will be given of example interconnection control and power supply control by the host connection device 301 with reference to FIG. 5. When the power status of the host device 101 changes, the host monitoring unit 32 detects a change in the connection status of the host connection 30, and notifies the host connection controller 33 of the detection of the change in the connection status of the host connection 30 (step S101). Since the change in the connection status is detected (step S102: Detection), the host connection device 301 checks the presence/absence of a power-linking permitted device (step S103). In this example, the power linking of the I/O device 201 is permitted (step S103: YES). Accordingly, the host connection device 301 performs an interconnection control with the I/O connection device 401 (step S104).

Figure 6:
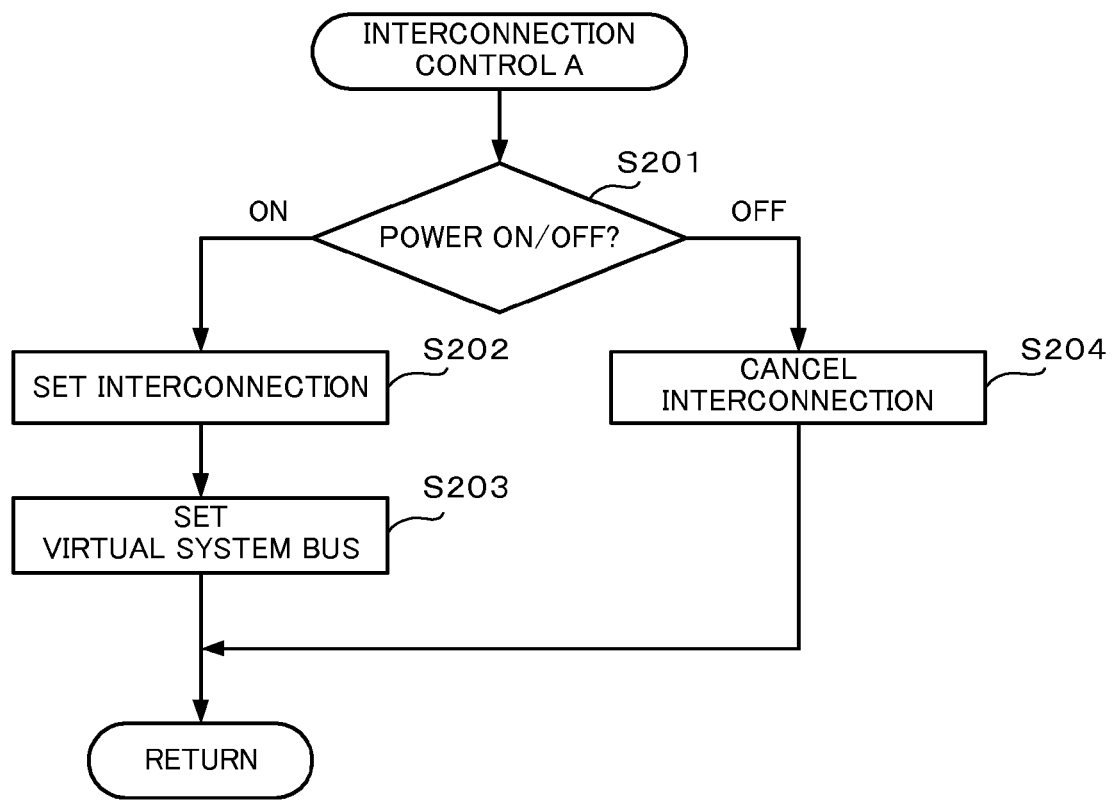
FIG. 6 is a flowchart illustrating an example operation of an interconnection control A to be executed by the connection device according to the first embodiment.

FIG. 6 is a flowchart illustrating an example operation of an interconnection control to be executed by the connection device according to the first embodiment. FIG. 6 illustrates the detail of the step S104 in FIG. 5. In FIG. 6, the example operation of the interconnection control according to the first embodiment is illustrated as an interconnection control A. The interconnection process A by the host connection device 301 will be explained with reference to FIG. 6. When the power status of the host device 101 changes to be ON (step S201: ON), the host connection controller 33 notifies the I/O connection controller 43 of the establishment of the host connection 30 and the setting for the interconnection, and sets the interconnection with the I/O connection controller 43 (step S202). When the interconnection between the host connection controller 33 and the I/O connection controller 43 is set, a virtual system bus for the host transfer unit 31 is set (step S203).

When the power status of the host device 101 changes to be OFF (step S201: OFF), the host connection controller 33 notifies the I/O connection controller 43 of the cancellation of the host connection 30 and the cancellation of the interconnection, and cancels the interconnection with the I/O connection controller 43 (step S204). After the completion of the interconnection device A in FIG. 6, that is, the step S104 in FIG. 5, the host connection device 301 checks the presence/absence of the other power-linking permitted device than the I/O device 201 (step S103 in FIG. 5). In the case of the logic group A3, since there is no other power-linking permitted device (step S103: NO), the host connection device 301 terminates the interconnection control and power supply control.

Next, an explanation will be given of an operation of the I/O connection device 401 when receiving the notification from the host connection device 301 of the change in the connection status of the host connection 30 and the setting or cancellation of the interconnection. Through the interconnection control by the host connection device 301 (step S104 in FIG. 5, that is, the interconnection control A in FIG. 6), the I/O connection controller 43 receives the notification from the host connection controller 33 of the change in the connection status of the host connection 30 and the setting or cancellation of the interconnection (step S101 and S102: NOTIFICATION RECEIVED in FIG. 5). When the I/O connection controller 43 receives this notification, the I/O connection device 401 performs a power supply control (step S105 in FIG. 5).

Figure 7:
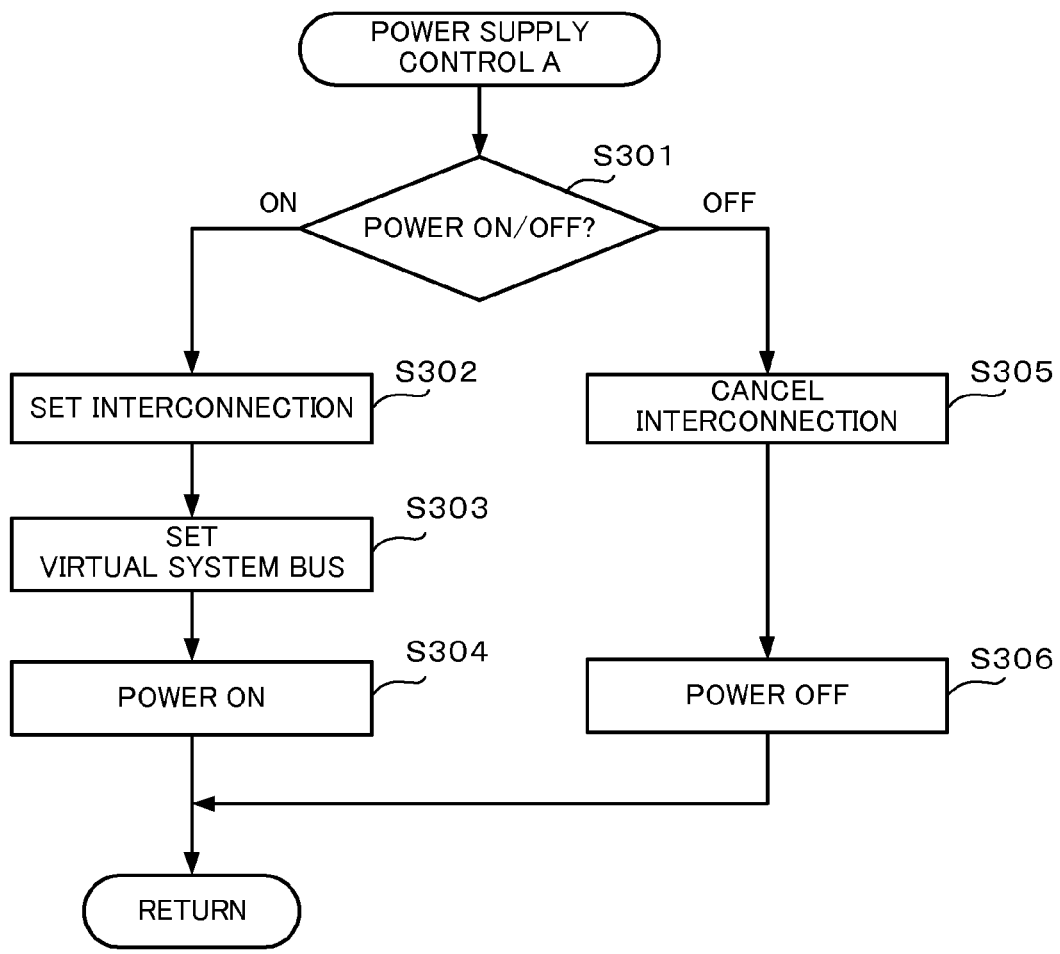
FIG. 7 is a flowchart illustrating an example operation of a power supply control A to be executed by the connection device according to the first embodiment.

FIG. 7 is a flowchart illustrating an example operation of a power supply control performed by the connection device according to the first embodiment. FIG. 7 illustrates the detail of the step S105 in FIG. 5. In FIG. 7, the example operation of the power supply control is illustrated as a power supply control A. An explanation will be given of the power supply control by the I/O connection device 401 with reference to FIG. 7. When the power status of the host device 101 changes to be ON (step S301: ON), the I/O connection controller 43 sets an interconnection with the host connection controller 33 (step S302). When the interconnection between the host connection controller 33 and the I/O connection controller 43 is set, a virtual system bus for the I/O transfer unit 41 is set (step S303). When the setting for the interconnection between the host connection controller 33 and the I/O connection controller 43 completes, the I/O connection controller 43 notifies the I/O power supply controller 44 of the establishment of the host connection 30 and the completion of the setting for the interconnection between the host connection controller 33 and the I/O connection controller 43. Upon reception of such a notification, the I/O power supply controller 44 turns ON the I/O power supply 20 of the I/O device 201 (step S304).

The setting for the virtual system bus in the step S303 may be carried out after the process of turning ON the power supply in the step S304 completes. The same is true in the following explanation.

When the power status of the host device 101 changes to be OFF (step S301: OFF), the I/O controller 43 cancels the interconnection with the host connection controller 33 (step S305). When the cancellation of the interconnection between the host connection controller 33 and the I/O connection controller 43 completes, the I/O connection controller 43 notifies the I/O power supply controller 44 of the cancellation of the host connection 30, and the completion of the cancellation of the interconnection between the host connection controller 33 and the I/O connection controller 43. The I/O power supply controller 44 that has received such a notification turns OFF the I/O power supply 20 of the I/O device 201 (step S306). After the execution of the step S304 or S306, the I/O connection device 401 returns the process to the step S101 upon completion of the step S105 in FIG. 5 (power supply control A in FIG. 7).

The I/O connection device 401 has received the notification from the host connection device 301 of the change in the connection status of the host connection 30 and the setting or cancellation of the interconnection, and has changed the ON/OFF states of the I/O power supply 20 in the I/O device 201, and thus the I/O connection device 401 detects a change in the connection status of the I/O connection 40 (steps S101 and S102: DETECTION in FIG. 5). In the case of the logic group A denoted by number 3 in FIG.1, there is no other power-linking permitted device than the host device 101 (step S103: NO in FIG. 5), and thus the I/O connection device 401 terminates the interconnection control and power supply control.

It is presumed that in the logic group A denoted by number 3 in FIG.1, the I/O connection device 401 is set to permit the power linking of the host device 101. When the power status of the I/O device 201 changes, the I/O connection device 401 detects the change in the connection status of the I/O connection 40 (steps S101 and S102: DETECTION in FIG. 5). Since the power linking of the host device 101 is permitted (step S103: YES in FIG. 5), the I/O connection device 401 performs an interconnection control with the host connection device 301 (step S104 in FIG. 5, that is, the interconnection control A in FIG. 6). Thereafter, the I/O connection device 401 terminates the interconnection control through the above-explained procedures. Conversely, like the case in which the power status of the host device 101 changes, the host connection device 301 performs a power control in accordance with the process illustrated in FIGS. 5 and 7, and changes the ON/OFF states of the host power supply 10 in the host device 101 (step S105 in FIG. 5, that is, the power control A in FIG. 7). Based on this changing operation, the host connection device 301 detects a change in the connection status of the host connection 30 (steps S101 and S102: DETECTION in FIG. 5). In the case of the logic group A denoted by number 3 in FIG.1, there is no other power-linking permitted device than the I/O device 201 (step S103: NO in FIG. 5), and thus the host connection device 301 terminates the interconnection control and power supply control.

Each connection device always receives the detection of the change in the connection status of the system bus or the notification of the change in the connection status of the system bus, and repeats the interconnection control and power supply control illustrated in FIG. 5. The same is true in the following explanation.

(When Host Device and I/O Devices are connected in One by N Manner) It is presumed that in the logic group B denoted by number 4 in FIG.1, the host connection device 302 is set to permit respective power linking of the I/O devices 202, 203, and 204. When the power status of the host device 102 changes, the host connection device 302 detects a change in the connection status of the host connection 30 (steps S101 and S102: DETECTION in FIG. 5). Since the power linking of the I/O devices 202, 203, and 204 are permitted (step S103: YES in FIG. 5), the host connection device 302 repeats the steps S103 and S104 in FIG. 5 equal to only the number of power-linking permitted devices. The interconnection control with multiple connection devices (step S104 in FIG. 5, that is, the interconnection control A in FIG. 6) may be performed in a parallel manner. When the interconnection control (step S104 in FIG. 5, that is, the interconnection control A in FIG. 6) with the I/O connection devices 402, 403, and 404 completes, the host connection device 302 terminates the interconnection control and power supply control since there is no other power-linking permitted device (step S103: NO in FIG. 5).

Next, an explanation will be given of the operations of the I/O connection devices 402, 403, and 404 which have received the notification from the host connection device 302 of the change in the connection status of the host connection 30 and the setting or cancellation of the interconnection. The interconnection control and the power supply control by the I/O connection devices 402, 403, and 404 are the same as those in the case of the logic group A denoted by number 3 in FIG.1. Upon reception of the notification from the host connection device 302 of the change in the connection status of the host connection 30 and the setting or cancellation of the interconnection (steps S101 and S102: NOTIFICATION RECEIVED in FIG. 5), the respective I/O connection devices 402, 403, and 404 perform the power supply control and change the ON/OFF states of the respective I/O power supplies 20 in the I/O devices 202, 203, and 204 (step S105 in FIG. 5, that is, the power supply control A in FIG. 7). In FIG. 5, when the step S105 (the power supply control A in FIG. 7) completes, the respective I/O connection devices 402, 403, and 404 return to the step S101.

Since the respective I/O connection devices 402, 403, and 404 have received the notification from the host connection device 302 of the change in the connection status of the host connection 30 and the setting or cancellation of the interconnection, and has changed the ON/OFF states of the I/O power supplies 20 in the respective I/O devices 202, 203, and 204, the respective I/O connection devices 402, 403, and 404 detect a change in the connection status of the respective I/O connections 40 (steps S101 and S102: Detection). The all I/O connection devices 402, 403, and 404 terminate the interconnection control and power supply control since there is no other power-linking permitted device than the host device 102 (step S103: NO).

When the notification is transmitted to all other connection devices present in the logic group, such a notification may be carried out through a broadcasting. The same is true in the following explanation.

It is presumed that in the logic group B4, the I/O connection device 402 is set to permit the power linking of the host device 102, and the host connection device 302 is set to permit the power linking of the I/O device 204. The interconnection control and power supply control by the I/O connection device 402 are the same as those in the case of the logic group A denoted by number 3 in FIG.1. The I/O connection device 402 detects a change in the connection status of the I/O connection 40 (steps S101 and S102: DETECTION in FIG. 5). Since the power linking of the host device 102 is permitted (step S103: YES in FIG. 5), the I/O connection device 402 performs an interconnection control with the host connection device 302 (step S104 in FIG. 5, that is, the interconnection control A in FIG. 6). After the completion of the interconnection control A in FIG. 6, that is, the step S104 in FIG. 5, the I/O connection device 402 terminates the interconnection control and power supply control since there is no other power-linking permitted device than the host device 102 (step S103: NO).

Next, an explanation will be given of an operation of the host connection device 302 that has received the notification from the I/O connection device 402 of the change in the connection status of the I/O connection 40 and the setting or cancellation of the interconnection. The host connection device 302 receives the notification from the I/O connection device 402 of the change in the connection status of the I/O connection 40 and the setting or cancellation of the interconnection (steps S101 and S102: NOTIFICATION RECEIVED in FIG. 5), performs the power supply control, and changes the ON/OFF states of the host power supply 10 in the host device 102 (step S105 in FIG. 5, that is, the power supply control A in FIG. 7). In FIG. 5, when completing the step S105 (the power supply control A in FIG. 7), the host connection device 302 returns the process to the step S101.

Since the host connection device 302 has received the notification from the I/O connection device 402 of the change in the connection status of the I/O connection 40 and the setting or cancellation of the interconnection, and has changed the ON/OFF states of the host power supply 10 in the host device 102, the host connection device 302 detects a change in the connection status of the host connection 30 (steps S101 and S102: DETECTION in FIG. 5). Since the power linking of the I/O device 204 is permitted (step S103: YES in FIG. 5), the host connection device 302 performs an interconnection control with the I/O connection device 404 (step S104 in FIG. 5, that is, the interconnection control A in FIG. 6). When completing the step S104 in FIG. 5, the host connection device 302 returns the process to the step S103, and terminates the interconnection control and power supply control since there is no other power-linking permitted device than the I/O devices 202 and 204 (step S103: NO in FIG. 5).

Next, an explanation will be given of an operation of the I/O connection device 404 that has received the notification from the host connection device 302 of the change in the connection status of the host connection 30 and the setting or cancellation of the interconnection. The I/O connection device 404 receives the notification from the host connection device 302 of the change in the connection status of the host connection 30 and the setting or cancellation of the interconnection (steps S101 and S102: NOTIFICATION RECEIVED in FIG. 5), and performs a power supply control (step S105 in FIG. 5, that is, the power supply control A in FIG. 7). In FIG. 5, when completing the step S105 (the power supply control A in FIG. 7), the I/O connection device 404 returns the process to the step S101.

Since the I/O connection device 404 has received the notification from the host connection device 302 of the change in the connection status of the host connection 30 and the setting or cancellation of the interconnection, and has changed the ON/OFF states of the I/O power supply 20 in the I/O device 204, the I/O connection device detects a change in the connection status of the I/O connection 40 (steps S101 and S102: DETECTION). Since there is no other power-linking permitted device than the host device 102 (step S103: NO), the I/O connection device 404 terminates the interconnection control and power supply control.

This computer system 1 may employ a configuration in which the I/O connection device 402 notifies the I/O connection device 404 of the change in the connection status of the system bus and the setting or cancellation of the interconnection. The same is true in the following explanation.

As explained above, according to the computer system 1 of the first embodiment, each host device and each I/O device has individual power supply, and each host device provided with the CPU device and each I/O device provided with the peripheral device are capable of suppressing the power consumption of the computer system 1 connected over the network 2 through respective connection devices. Moreover, it becomes possible to prevent the computer system 1 from operating in an incomplete system configuration in which no power is supplied to the CPU devices of some host devices or the peripheral devices of some I/O devices.

The computer system 1 according to the first embodiment controls the power supply of each host device or I/O device after the completion of the setting or cancellation of the interconnection between the connection devices. When, for example, the computer system 1 includes a CPU device that becomes an error state if such a CPU device is unconnected with the peripheral device at the time of startup, the computer system 1 performs the control so as to turn ON the power supply of the CPU device after the setting for the interconnection between the connection devices completes. Accordingly, the computer system 1 is capable of operating normally.

(Second Embodiment)

A computer system according to a second embodiment of the present invention employs the same structure as that of FIG. 1. However, unlike the first embodiment, the computer system 1 according to the second embodiment has each connection device which performs a power supply control without waiting for the completion of the setting or cancellation of the interconnection between the connection devices. An explanation below will be given of an interconnection control and a power supply control in the computer system 1 according to the second embodiment.

Figure 8:
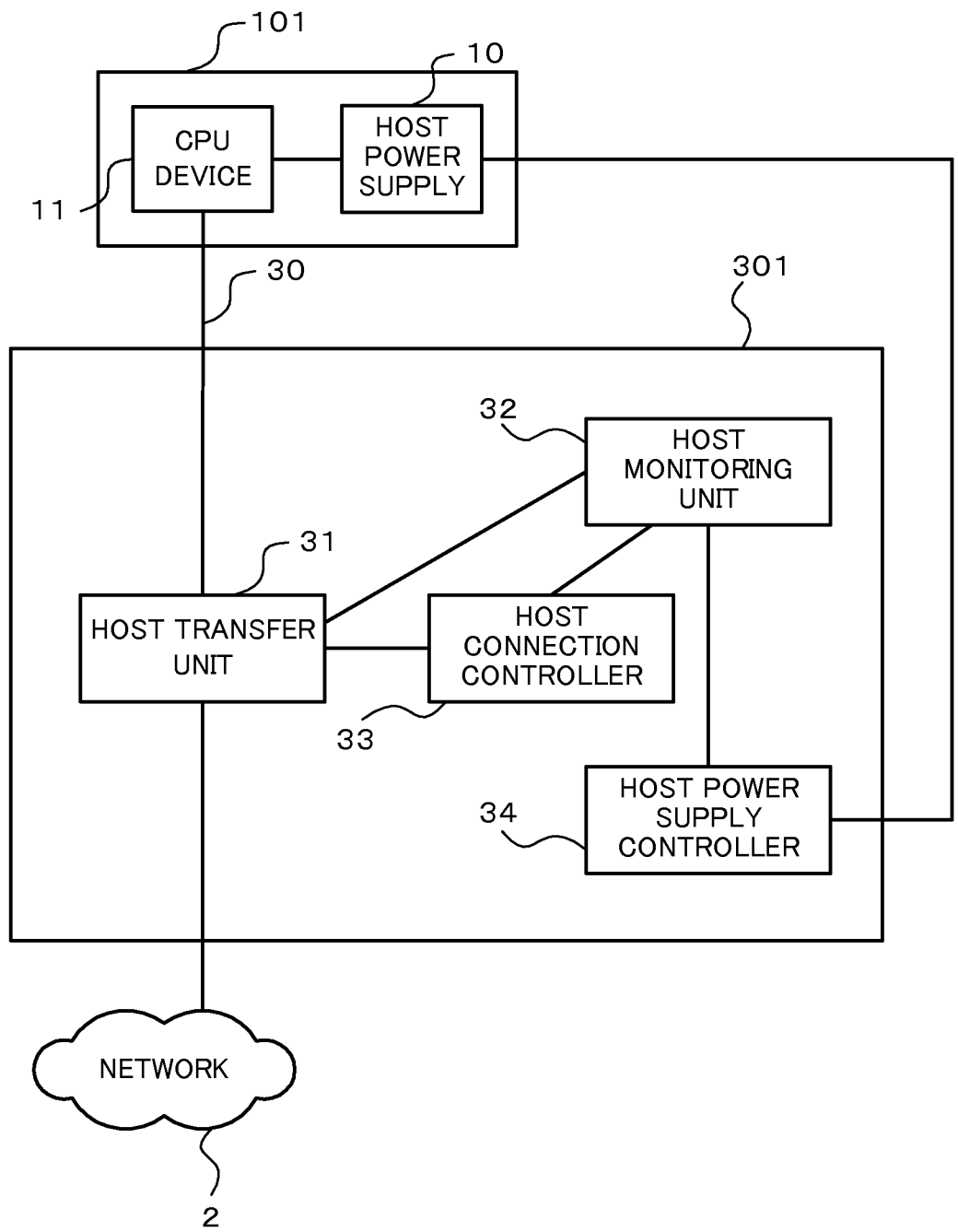
FIG. 8 is a block diagram illustrating an example configuration of a host connection device according to a second embodiment of the present invention.

FIG. 8 is a unit diagram illustrating an example configuration of a host connection device according to the second embodiment of the present invention. A host connection device 301 includes a host transfer unit 31, a host monitoring unit 32, a host connection controller 33, and a host power supply controller 34.

Figure 9:
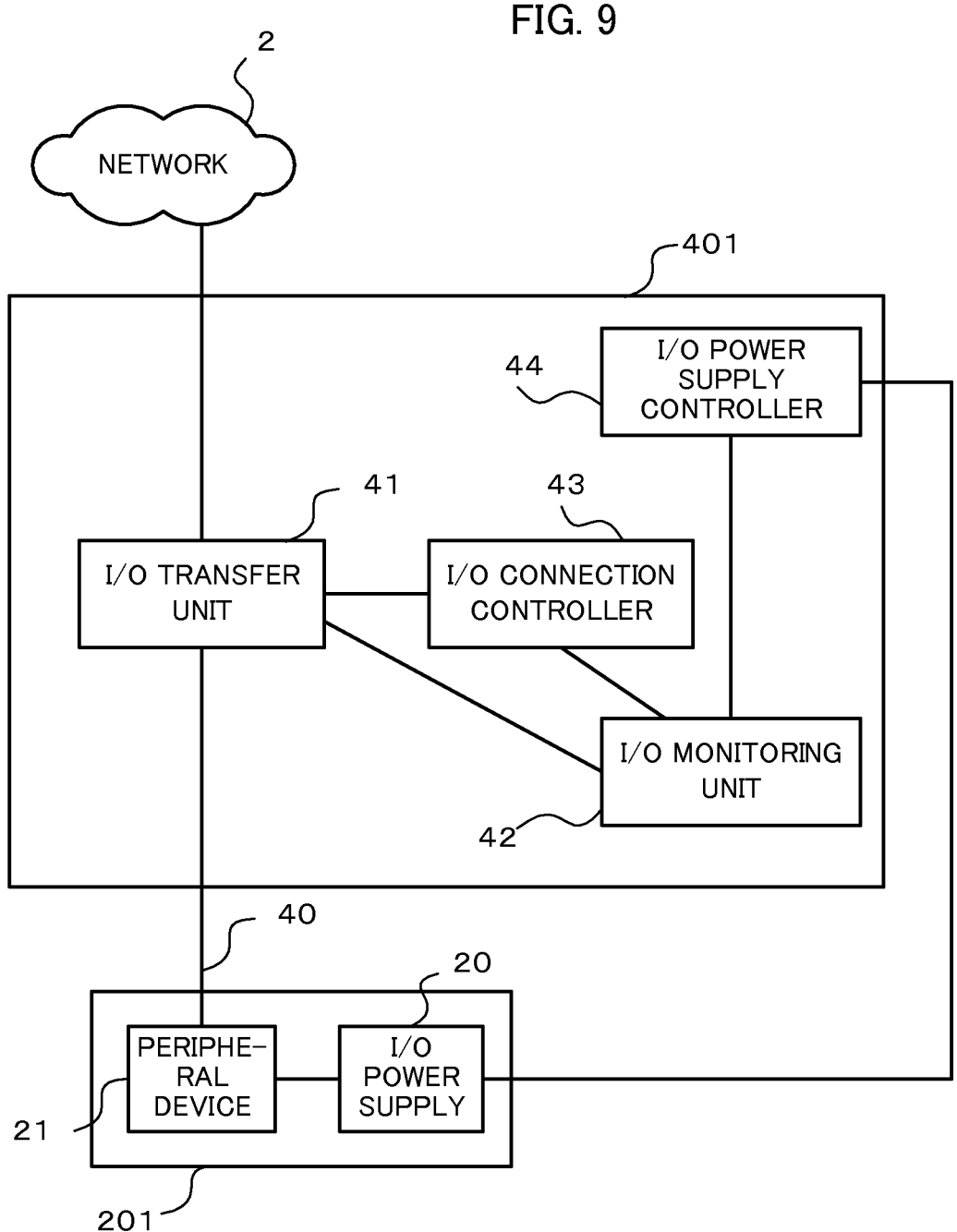
FIG. 9 is a block diagram illustrating an example configuration of an I/O connection device according to the second embodiment.

FIG. 9 is a unit diagram illustrating an example configuration of an I/O connection device according to the second embodiment. An I/O connection device 401 includes an I/O transfer unit 41, an I/O monitoring unit 42, an I/O connection controller 43, and an I/O power supply controller 44. With reference to FIGS. 8 and 9, an explanation will be given of an interconnection control and a power supply control performed by each connection device.

The host connection 30 and the I/O connection 40 are the same as those of the first embodiment. The operation of the host transfer unit 31 is the same as that of the first embodiment, but the host transfer unit 31 according to the second embodiment is further connected with a host monitoring unit 32, and exchanges packets with the host monitoring unit 32. Like the host transfer unit 31, the operation of the I/O transfer unit 41 is the same as that of the first embodiment, but the I/O transfer unit is further connected with the I/O monitoring unit 42, and exchanges packets with the I/O monitoring unit 42. The respective operations of the host power supply controller 34 and the I/O power supply controller 44 are the same as those of the first embodiment, but the host power supply controller and the I/O power supply controller are respectively connected with the host monitoring unit 32 and the I/O monitoring unit 42, not the host connection controller 33 and the I/O connection controller 43.

The host monitoring unit 32 monitors the connection status of the host connection 30, and detects a change in the connection status of the host connection 30. When detecting the change in the connection status of the host connection 30, the host monitoring unit 32 notifies the host connection controller 33 connected with the host monitoring unit 32 and the I/O monitoring unit 42 of the detected change in the connection status.

The host connection controller 33 that has received the notification from the host monitoring unit 32 of the detected change in the connection status of the host connection 30 notifies the I/O connection controller 43 of the change in the connection status of the host connection 30 and the setting or cancellation of the interconnection. The host connection controller 33 sets or cancels the interconnection with the I/O connection controller 43.

When receiving the notification from the I/O monitoring unit 42 of the change in the connection status of the I/O connection 40 through the host transfer unit 31, the host monitoring unit 32 notifies the host power supply controller 34 connected with the host monitoring unit 32 of the change in the connection status of the I/O connection 40.

The host power supply controller 34 that has received such a notification changes the ON/OFF states of the host power supply 10 connected with the host power supply controller 34. When the host power supply controller 34 changes the ON/OFF states of the host power supply 10, it does not matter whether the setting or cancellation of the interconnection between the I/O connection controller 43 and the host connection controller 33 has completed or does not complete yet.

The I/O monitoring unit 42 monitors the connection status of the I/O connection 40, and detects a change in the connection status of the I/O connection 40. When detecting the change in the connection status of the I/O connection 40, the I/O monitoring unit 42 notifies the I/O connection controller 43 connected with the I/O monitoring unit 42 and the host monitoring unit 32 through the I/O transfer unit 41 of the detected change in the connection status.

The I/O connection controller 43 that has received the notification from the I/O monitoring unit 42 of the change in the connection status of the I/O connection 40 notifies the host connection controller 33 of the change in the connection status of the I/O connection 40 and the setting or cancellation of the interconnection. The I/O connection controller 43 sets or cancels the interconnection with the host connection controller 33.

When receiving the notification from the host monitoring unit 32 of the change in the connection status of the host connection 30, the I/O monitoring unit 42 notifies the I/O power supply controller 44 connected with the I/O monitoring unit 42 of the change in the connection status of the host connection 30.

The I/O power supply controller 44 that has received such a notification changes the ON/OFF states of the I/O power supply 20 connected with the I/O power supply controller 44. When the I/O power supply controller 44 changes the ON/OFF states of the I/O power supply 20, it does not matter whether the setting or cancellation of the interconnection between the host connection controller 33 and the I/O connection controller 43 has completed or does not complete yet.

According to the second embodiment, like the first embodiment, a setting for permitting a power linking with each host device or I/O device can be made to each connection device.

An explanation will be given of successive operations of changing the power status of other host device or I/O device in a linked manner by each connection device performing the interconnection control and power supply control explained with reference to FIGS. 8 and 9 when the power status of a host device or I/O device in the computer system 1 changes. The operations of the interconnection control and power supply control performed by the connection device according to the second embodiment are the same as the operations in FIG. 5. Like the first embodiment, each connection device operates in accordance with the flowchart of FIG. 5.

In the following explanation, the operations of the interconnection control and power supply control performed by each connection device in FIG. 5 are the same as those of the first embodiment, and the detail of the processes in the step S104 and S105 in FIG. 5 differs from those of the first embodiment. An order of changing the power status of other host device or I/O device in accordance with the change in the power status of a host device or I/O device is the same as that of the first embodiment.

(When Host Device and I/O Device are Connected One by One) It is presumed that in the logic group A denoted by number 3 in FIG. 1, the host connection device 301 is set to permit the power linking of the I/O device 201. When the power status of the host device 101 changes, the host monitoring unit 32 detects a change in the connection status of the host connection 30, and notifies the host connection controller 33 of the detected change in the connection status of the host connection 30 (step S101 in FIG. 5). Since the change in the connection status is detected (step S102: DETECTION in FIG. 5), the host connection device 301 checks the presence/absence of the power-linking permitted device. Since the power 32 linking with the I/O device 201 is permitted (step S103: YES in FIG. 5), the host connection device performs an interconnection control with the I/O connection device 401 (step S104 in FIG. 5).

Figure 10:
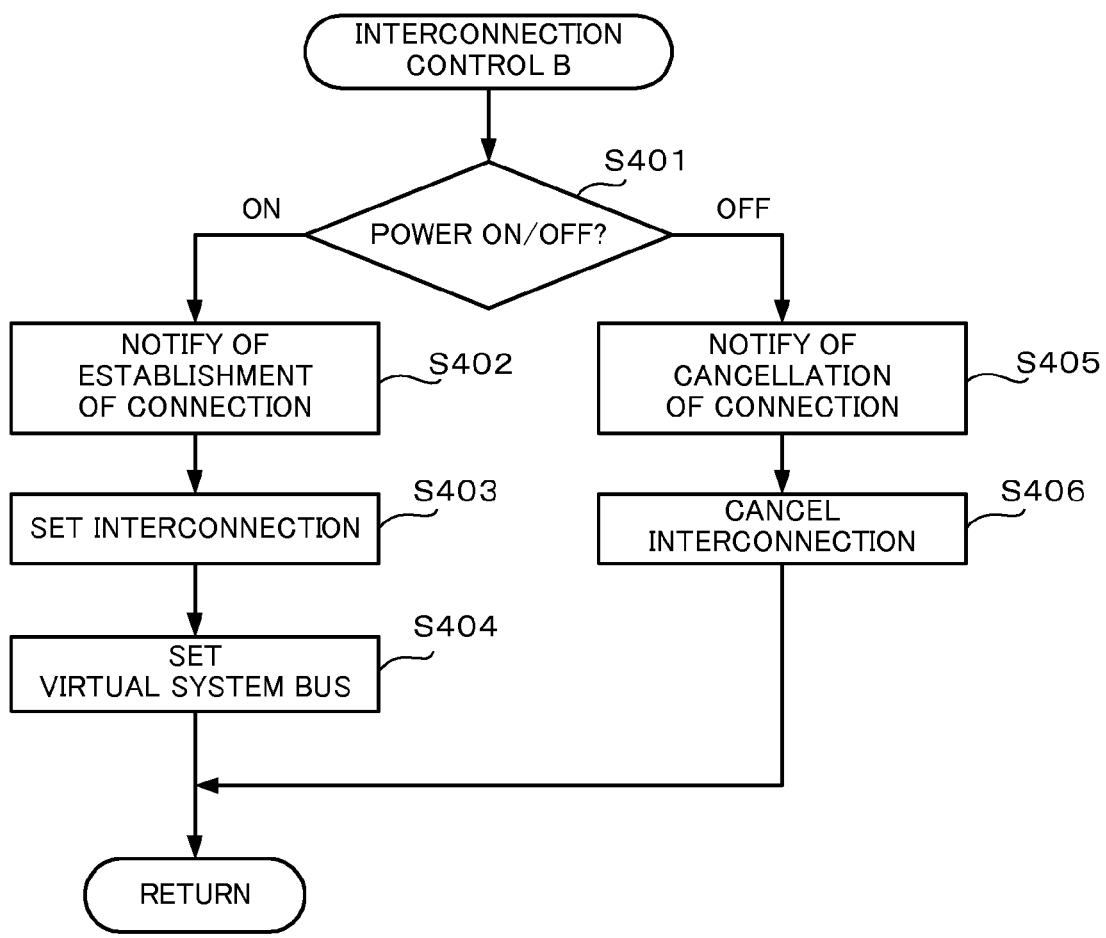
FIG. 10 is a flowchart illustrating an example operation of an interconnection control B to be executed by the connection device according to the second embodiment.

FIG. 10 is a flowchart illustrating an example operation of the interconnection control performed by the connection device according to the second embodiment. FIG. 10 illustrates the detail of the step S104 in FIG. 5. In FIG. 10, the example operation of this interconnection control is illustrated as an interconnection control B. An explanation will be given of the operation of the host connection device 301 with reference to FIG. 10. When the power status of the host device 101 changes to be ON (step S401: ON), the host monitoring unit 32 notifies, through the host transfer unit 31, the I/O monitoring unit 42 of the establishment of the host connection 30 (step S402). The host connection controller 33 notifies the I/O connection controller 43 of the establishment of the host connection 30 and the setting for the interconnection, and sets the interconnection with the I/O connection controller 43 (step S403). When the setting for the interconnection between the host connection controller 33 and the I/O connection controller 43 completes, the setting for the virtual system bus for the host transfer unit 31 is made (step S404).

When the power status of the host device 101 changes to be OFF (step S401: OFF), the host monitoring unit 32 notifies, through the host transfer unit 31, the I/O monitoring unit 42 of the cancellation of the host connection 30 (step S405). The host connection controller 33 notifies the I/O connection controller 43 of the cancellation of the host connection 30 and the cancellation of the interconnection, and cancels the interconnection with the I/O connection controller 43 (step S406). After the completion of the interconnection control B in FIG. 10, that is, the step S104 in FIG. 5, the host connection device 301 returns the process to the step S103. In the case of the logic group A denoted by number 3 in FIG.1, since there is no other power-linking permitted device than the I/O device 201 (step S103: NO in FIG. 5), the host connection device 301 terminates the interconnection control and power supply control.

Next, an explanation will be given of the operation of the I/O connection device 401 that has received the notification from the host connection device 301 of the change in the connection status of the host connection 30 with reference to FIG. 5. Through the interconnection control (step S104 in FIG. 5, that is, the interconnection control B in FIG. 10) explained above and performed by the host connection device 301, the I/O monitoring unit 42 receives, through the I/O transfer unit 41, the notification from the host monitoring unit 32 of the change in the connection status of the host connection 30 (steps S101 and S102: NOTIFICATION RECEIVED in FIG. 5). After receiving the notification, the I/O connection device 401 performs a power supply control (step S105 in FIG. 5).

Figure 11:
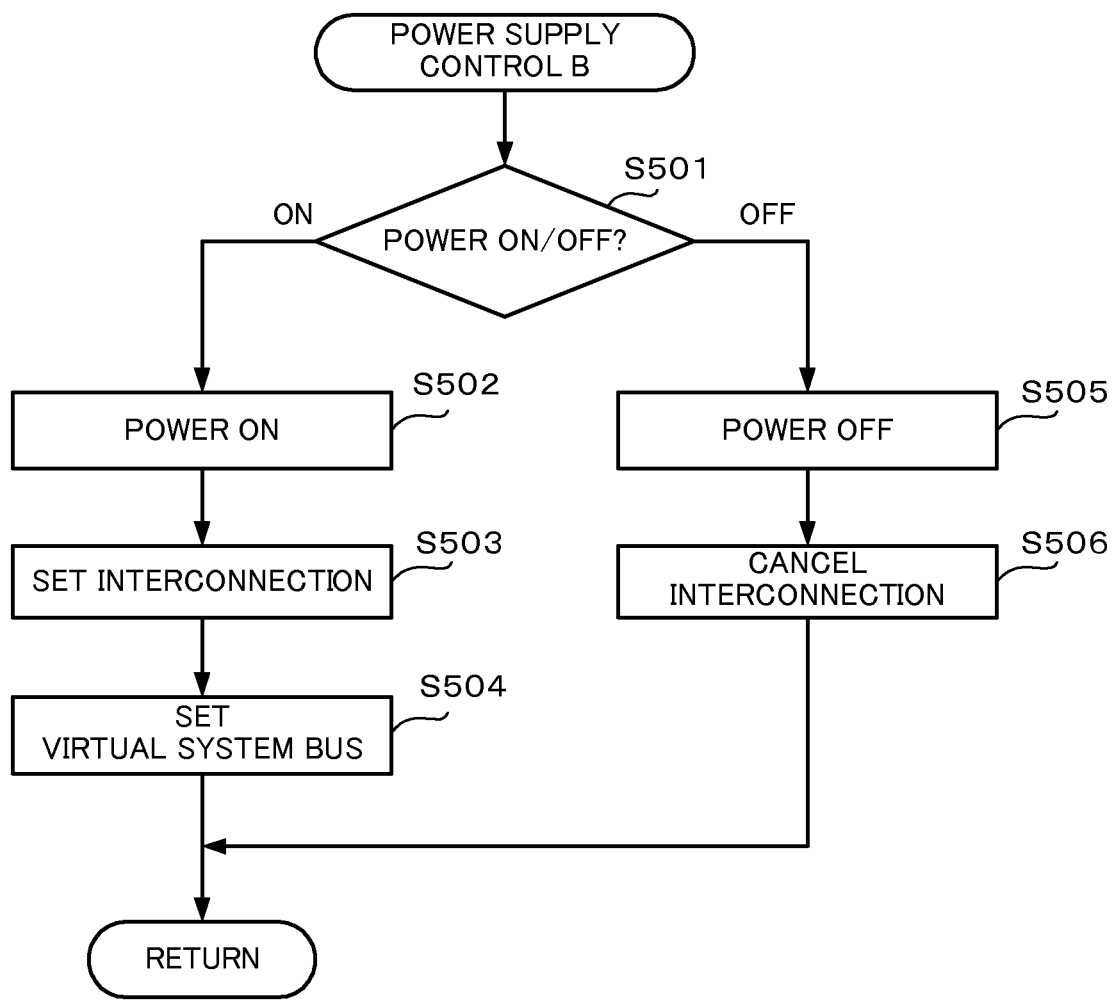
FIG. 11 is a flowchart illustrating an example operation of a power supply control B to be executed by the connection device according to the second embodiment.

FIG. 11 is a flowchart illustrating an example operation of the power supply control performed by the connection device according to the second embodiment. FIG. 11 illustrates the detail of the step S105 in FIG. 5. In FIG. 11, the example operation of this power supply control is illustrated as a power supply control B. The operation of the I/O connection device 401 will be explained with reference to FIG. 11. When the power status of the host device 101 changes to be ON (step S501: ON), the I/O monitoring unit 42 notifies the I/O power supply controller 44 of the establishment of the host connection 30. The I/O power supply controller 44 that has received the notification turns ON the I/O power supply 20 of the I/O device 201 (step S502). The I/O connection controller 43 that has received the notification from the host connection controller 33 of the establishment of the host connection 30 and the setting for the interconnection sets the interconnection with the host connection controller 33 (step S503). When the setting for the interconnection between the host connection controller 33 and the I/O connection controller 43 completes, a setting for a virtual system bus for the I/O transfer unit 41 is made (step S504).

When the power status of the host device 101 changes to be OFF (step S501: OFF), the I/O monitoring unit 42 notifies the I/O power supply controller 44 of the cancellation of the host connection 30. The I/O power supply controller 44 that has received the notification turns OFF the I/O power supply 20 of the I/O device 201 (step S505). The I/O connection controller 43 that has received the notification from the host connection controller 33 of the cancellation of the host connection 30 and the cancellation of the interconnection cancels the interconnection with the host connection controller 33 (step S506). After the completion of the power supply control B in FIG. 11, that is, the step S105 in FIG. 5, the I/O connection device 401 returns the process to the step S101 in FIG. 5.

Since the I/O connection device 401 has received the notification from the host connection device 301 of the change in the connection status of the host connection 30, and has changed the ON/OFF states of the I/O power supply 20 in the I/O device 201, the I/O connection device detects a change in the connection status of the I/O connection 40 (steps S101 and S102: DETECTION in FIG. 5). In the case of the logic group A denoted by number 3 in FIG. 1, since there is no other power-linking permitted device than the host device 101 (step S103: NO in FIG. 5), the I/O connection device 401 terminates the interconnection control and power supply control.

It is presumed that in the logic group A denoted by number 3 in FIG. 1, the I/O connection device 401 is set to permit the power linking of the host device 101. When the power status of the I/O device 201 changes, the I/O connection device 401 detects a change in the connection status of the I/O connection 40 (steps S101 and S102: DETECTION in FIG. 5). Since the power linking of the host device 101 is permitted (step S103: YES in FIG. 5), the I/O connection device 401 performs an interconnection control with the host connection device 301 (step S104 in FIG. 5, that is, the interconnection control B in FIG. 10). Thereafter, the I/O connection device 401 terminates the interconnection control and power supply control as explained above. Conversely, the host connection device 301 performs a power supply control like the case in which the power status of the host device 101 changes, and changes the ON/OFF states of the host power source 10 in the host device 101 (step S105 in FIG. 5, that is, the power supply control B in FIG. 11). Through such a changing, the host connection device 301 detects a change in the connection status of the host connection 30 (steps S101 and S102: DETECTION in FIG. 5). In the case of the logic group A denoted by number 3 in FIG. 1, since there is no other power-linking permitted device than the I/O device 201 (step S103: NO in FIG. 5), the host connection device 301 terminates the interconnection control and power supply control.

(When Host Device and I/O Devices are Connected in One by N Manner) It is presumed that in the logic group B denoted by number 4 in FIG. 1, the host connection device 302 is set to permit the power linking of the I/O devices 202, 203, and 204. When the power status of the host device 102 changes, the host connection device 302 detects the change in the connection status of the host connection 30 (steps S101 and S102: DETECTION in FIG. 5). Since the power linking of the I/O devices 202, 203, and 204 are permitted (step S103: YES in FIG. 5), the host connection device 302 repeats the steps S103 to S104 in FIG. 5, and performs an interconnection control with the I/O connection devices 402, 403, and 404 (step S104 in FIG. 5, that is, the interconnection control B in FIG. 10). When the step S104 in FIG. 5 completes, the host connection device 302 returns the process to the step S103, and terminates the interconnection control and power supply control since there is no other power-linking permitted device (step S103: NO).

Next, an explanation will be given of the operation of the I/O connection devices 402, 403, and 404 that have received the notification from the host connection device 302 of the change in the connection status of the host connection 30. The interconnection control and power supply control by the I/O connection devices 402, 403, and 404 are the same as those of the case of the logic group A denoted by number 3 in FIG.1. The I/O connection devices 402, 403, and 404 respectively receive the notification from the host connection device 302 of the change in the connection status of the host connection 30 (steps S101 and S102: NOTIFICATION RECEIVED in FIG. 5), and perform a power supply control, thereby changing the ON/OFF states of the I/O power supplies 20 in the respective I/O devices 202, 203, and 204 (step S105 in FIG. 5, that is, the power supply control B in FIG. 11). In FIG. 5, when completing the step S105 (the power supply control B in FIG. 11), the respective I/O connection devices 402, 403, and 404 return to the step S101.

Since the I/O connection devices 402, 403, and 404 have received the notification from the host connection device 302 of the change in the connection status of the host connection 30, and have changed the ON/OFF states of the respective I/O power supplies 20 in the I/O devices 202, 203, and 204, the respective I/O connection devices detect a change in the connection status of the respective I/O connections 40 (steps S101 and S102: DETECTION in FIG. 5). The I/O connection devices 402, 403, and 404 terminate the interconnection control and power supply control since there is no other power-linking permitted device than the host device 102 (step S103: NO in FIG. 5).

It is presumed that in the logic group B denoted by number 4 in FIG. 1, the I/O connection device 402 is set to permit the power linking of the host device 102, and the host connection device 302 is set to permit the power linking of the I/O device 204. The interconnection control and power supply control by the I/O connection device 402 are the same as those of the case of the logic group A denoted by number 3 in FIG.1. The I/O connection device 402 detects a change in the connection status of the I/O connection 40 (steps S101 and S102: DETECTION in FIG. 5). Since the power linking of the host device 102 is permitted (step S103: YES in FIG. 5), the I/O connection device 402 performs an interconnection control with the host connection device 302 (step S104 in FIG. 5, that is, the interconnection control B in FIG. 10). After the completion of the step S104 in FIG. 5, the I/O connection device 402 returns the process to the step S103, and terminates the interconnection control and power supply control since there is no other power-linking permitted device than the host device 102 (step S103: NO).

Next, an explanation will be given of the operation of the host connection device 302 that has received the notification from the I/O connection device 402 of the change in the connection status of the I/O connection 40. The host connection device 302 receives the notification from the I/O connection device 402 of the change in the connection status of the I/O connection 40 (steps S101 and S102: NOTIFICATION RECEIVED in FIG. 5), and performs a power supply control, thereby changing the ON/OFF states of the host power supply 10 in the host device 102 (step S105 in FIG. 5, that is, the power supply control B in FIG. 11). In FIG. 5, after the completion of the step S105 (the power supply control B in FIG. 11), the host connection device 302 returns the process to the step S101.

Since the host connection device 302 has received the notification from the I/O connection device 402 of the change in the connection status of the I/O connection 40, and has changed the ON/OFF states of the host power supply 10 in the host device 102, the host connection device detects a change in the connection status of the host connection 30 (steps S101 and S102: DETECTION in FIG. 5). Since the power linking of the I/O device 204 is permitted (step S103: YES in FIG. 5), the host connection device 302 performs an interconnection control with the I/O connection device 404 (step S104 in FIG. 5, that is, the interconnection control B in FIG. 10). After the completion of the step S104 in FIG. 5, the host connection device 302 returns the process to the step S103, and terminates the interconnection control and power supply control since there is no other power-linking permitted device than the I/O devices 202 and 204 (step S103: NO).

Next, an explanation will be given of the operation of the I/O connection device 404 that has received the notification from the host connection device 302 of the change in the connection status of the host connection 30. The I/O connection device 404 receives the notification from the host connection device 302 of the change in the connection status of the host connection 30 (steps S101 and S102: NOTIFICATION RECEIVED in FIG. 5), and performs a power supply control, thereby changing the ON/OFF states of the I/O power supply 20 in the I/O device 204 (step S105 in FIG. 5, that is, the power supply control B in FIG. 11). In FIG. 5, after the completion of the step S105 (the power supply control B in FIG. 11), the I/O connection device 404 returns the process to the step S101.

Since the I/O connection device 404 has received the notification from the host connection device 302 of the change in the connection status of the host connection 30, and has changed the ON/OFF states of the I/O power supply 20 in the I/O device 204, the I/O connection device detects the change in the connection status of the I/O connection 40 (steps S101 and S102: DETECTION in FIG. 5). The I/O connection device 404 terminates the interconnection control and power supply control since there is no other power-linking permitted device than the host device 102 (step S103: NO).

As explained above, according to the computer system 1 according to the second embodiment, the power consumption of the computer system 1 having each host device and I/O device with individual power supply, and having each host device with a CPU device and each I/O device with a peripheral device connected over the network 2 through each connection device can be suppressed. Moreover, it becomes possible to prevent the computer system 1 from operating with an incomplete system configuration in which no power is supplied to the CPU devices of some host devices or the peripheral devices of some I/O devices.

Moreover, the computer system 1 according to the second embodiment performs a power supply control without waiting for the completion of the setting or cancellation of the interconnection between the connection devices, and thus the power supply control on each host device or I/O device in the computer system 1 can be performed at a faster speed than the first embodiment. When, for example, some peripheral devices in the computer system 1 need a longer time for startup than other peripheral devices, if the connection device according to the second embodiment is applied to some connection devices, the whole computer system 1 becomes operable at a faster speed.

Figure 12:
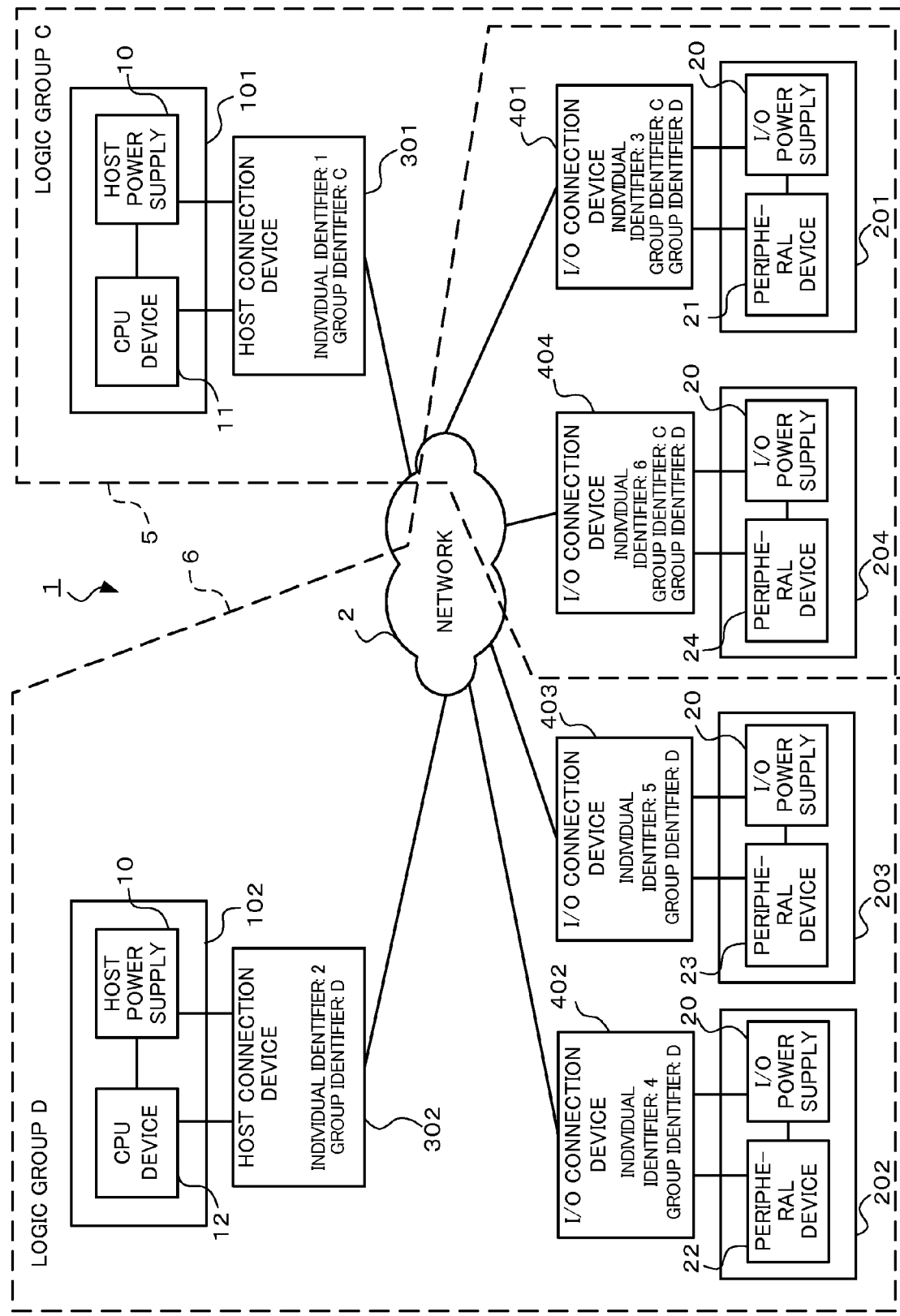
FIG. 12 is a block diagram illustrating an example configuration of a computer system according to a third embodiment of the present invention.

(Third Embodiment) FIG. 12 is a block diagram illustrating an example configuration of a computer system according to a third embodiment of the present invention. A computer system 1 according to the third embodiment employs a configuration in which a host device or I/O device belongs to equal to or greater than two logic groups. FIG. 12 illustrates a case in which an I/O device belongs to two logic groups. The host device 101 and the I/O devices 201 and 204 configure a logic group C denoted by number 5 in FIG. 12. The host device 102 and the I/O devices 201, 202, 203, and 204 configure a logic group D denoted by number 6 in FIG. 12. In the whole system, the host devices and the I/O devices are connected in an M by N manner, and in each logic group, a host device and the I/O devices are connected in a one by K (where K≤N) manner. M, N, and K are all natural numbers.

The computer system 1 in FIG. 12 includes, like the first embodiment or second embodiment, the host devices 101 and 102, the I/O devices 201, 202, 203, and 204, the host connection devices 301 and 302, and the I/O connection devices 401, 402, 403, and 404. The respective configurations of the host devices 101 and 102, and the I/O devices 201, 202, 203, and 204 are the same as those of the first embodiment or second embodiment.

The individual identifier set for each connection device and the topology of a logic group to which each connection device belongs are the same as those of the first embodiment or second embodiment. The difference from the first embodiment or second embodiment is that multiple group identifiers are set for each connection device according to the third embodiment. According to the example case illustrated in FIG. 12, group identifiers C and D are set for the I/O connection devices 401 and 404. According to the computer system 1 according to the third embodiment, for example, an I/O device is connectable with equal to or greater than two host devices. That is, the degree of freedom for setting and changing of the system configuration improves and an efficient operation of the resource, such as host devices or I/O devices, is enabled.

Figure 13:
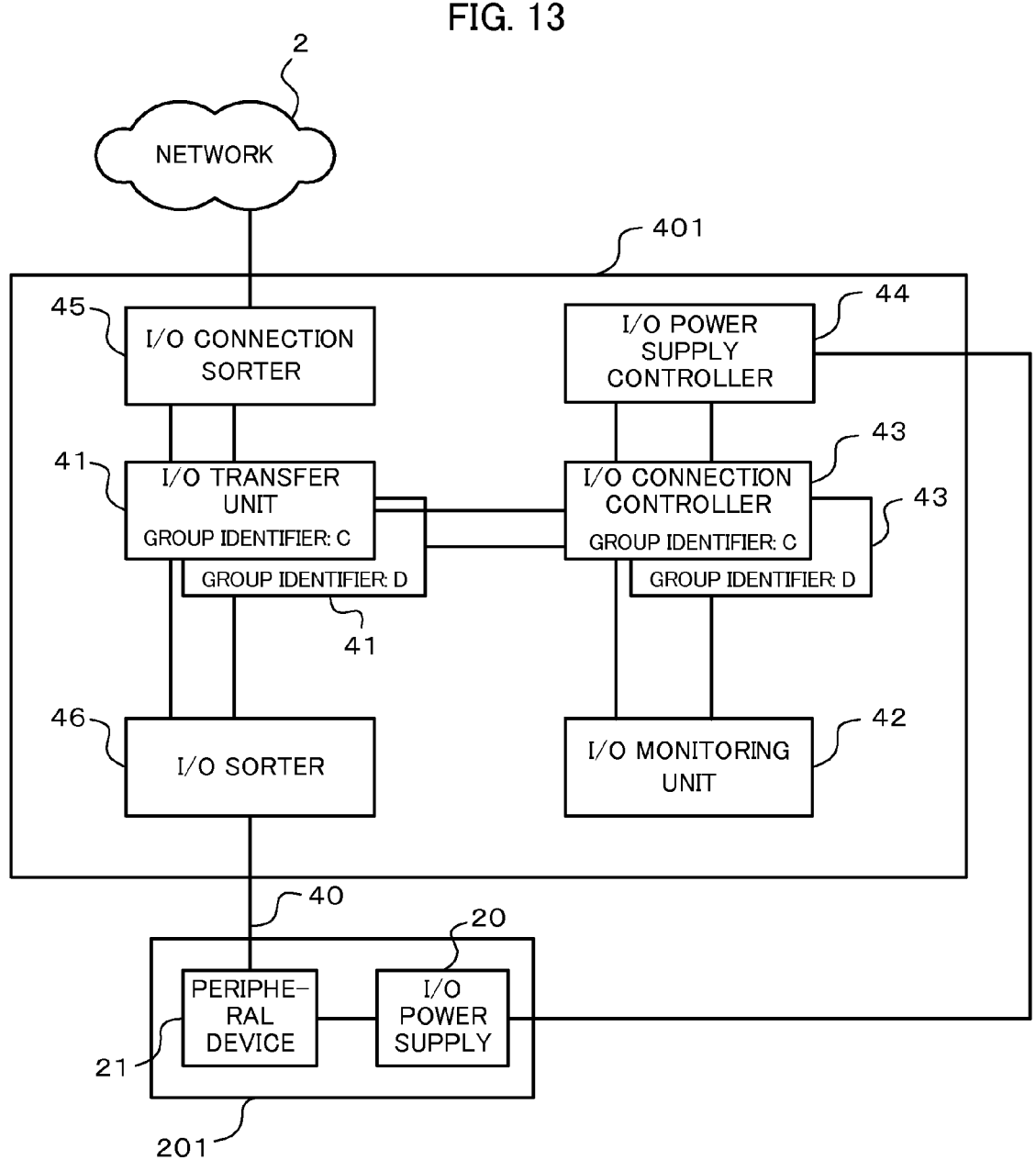
FIG. 13 is a block diagram illustrating an example configuration of an I/O connection device according to the third embodiment.

In the example case illustrated in FIG. 12, an explanation will be given of an operation of each component of the connection device set with multiple group identifiers with reference to the I/O connection device 401 set with the group identifiers C and D. FIG. 13 is a block diagram illustrating an example configuration of the I/O connection device according to the third embodiment. The I/O connection device 401 includes two I/O transfer units 41, the I/O monitoring unit 42, two I/O connection controller 43, the I/O power supply controller 44, an I/O connection sorter 45, and an I/O sorter 46. The I/O connection 40 between the I/O sorter 46 and the peripheral device 21 is a system bus. The I/O connection device 404 employs the same configuration.

The I/O transfer units 41 and the I/O connection controllers 43 are present by the same number, and a group identifier is set in advance for each combination including an I/O transfer unit 41 and an I/O connection controller 43. The I/O connection device 401 includes the I/O transfer unit 41 and I/O connection controller 43 which are set to group identifier C and the I/O transfer unit 41 and I/O connection controller 43 which are set to group identifier D. That is, the group identifiers C and D are set to the I/O connection device 401, and thus the I/O device 201 is connected with the host devices 101 and 102 through the I/O connection device 401 and the host connection devices 301 and 302.

In the example case illustrated in FIG. 13, the I/O connection device 401 includes the two I/O transfer units 41 and the two I/O connection controllers 43, but arbitrary number of I/O transfer units 41 and I/O connection controllers can be provided in accordance with the number of logic groups to which the I/O connection device 401 belongs. When the I/O connection device 401 includes only the combination of the I/O transfer unit 41 and the I/O connection controller 43 to which a group identifier is set, but does not include a combination of the I/O transfer unit 41 and the I/O connection controller 43 to which another group identifier is set, the I/O connection device 401 belongs to a logic group only, and operates like the I/O connection device 401 according to the first embodiment. The I/O transfer unit 41 and the I/O connection controller 43 are set in such a way that the I/O connection devices 402 and the I/O connection device 403 belong to respective logic groups only.

The I/O power supply controller 44 operates like in the first embodiment, and the I/O power supply controller 44 is connected with multiple (in the illustrated example, two) I/O connection controllers 43.

The I/O connection sorter 45 sorts packets transmitted from the network 2 to the respective I/O transfer units 41 based on the group identifier set for each packet. For example, the I/O connection sorter 45 transmits packets transmitted from the host connection device 301 belonging to the logic group C denoted by number 5 in FIG. 12 via the network 2 to the I/O transfer unit 41 in the I/O connection device 401 set with the group identifier C. The I/O connection sorter 45 transmits packets transmitted from each I/O transfer unit 41 in the I/O connection device 401 to the network 2. Moreover, when, for example, a conflict such that multiple host devices simultaneously send a request occurs, an adjustment for receiving the request is performed.

The I/O sorter 46 sorts packets transmitted from the I/O device 201 to each I/O transfer unit 41 based on the group identifier set for each packet. When, for example, the destination of packets is the host connection device 302, the I/O sorter 46 transmits the packets to the I/O transfer unit 41 in the I/O connection device 401 set with the group identifier D. The I/O sorter 46 transmits packets transmitted from each I/O transfer unit 41 in the I/O connection device 401 to the I/O device 201. When, for example, a conflict such that multiple I/O transfer units 41 with different group identifiers in the I/O connection device 401 simultaneously send a request occurs, the I/O sorter 46 performs an adjustment for a transmission of the request.

With respect to the I/O transfer unit 41, the conversion of the packets and the generation of the control packets are the same as those of the first embodiment. The exchange of the packets and that of the control packets are different from the first embodiment, and the I/O transfer unit 41 according to the third embodiment transmits the packets to the I/O connection sorter 45 or the I/O sorter 46.

With respect to the interconnection control and power supply control executed by the I/O connection device 401, a difference from the first embodiment will be explained. The setting for the virtual system bus for the I/O transfer unit 41 is made for each logic group. When, for example, the setting for the interconnection between the host connection device 301 and the I/O connection device 401 completes, the virtual system bus for the I/O transfer unit 41 set with the group identifier C is set.

Since there is a host device having the power linking permitted, when the I/O connection device 401 performs an interconnection control, the I/O connection controller 43 set with the group identifier of the logic group where that host device belongs notifies the host connection controller 33 in the host connection device belonging to the same logic group of the change in the connection status of the system bus and the setting or cancellation of the interconnection. When, for example, the I/O connection device 401 is set to permit the power linking of the host device 102, the I/O connection controller 43 set with the group identifier D notifies the host connection controller 33 in the host connection device 302 set with the same group identifier D of the change in the connection status of the system bus and the setting or cancellation of the interconnection.

When the I/O connection device 401 receives the notification from the host connection device of the change in the connection status of the system bus and the setting or cancellation of the interconnection, the I/O connection controller 43 set with the group identifier of the logic group where that host connection device belongs receives the notification of the change in the connection status of the system bus and the setting or cancellation of the interconnection from the host connection controller 33 in that host connection device, and sets or cancels the interconnection with that host connection controller 33.

When the setting or cancellation of the interconnection between the host connection controller 33 in the host connection device and the I/O connection controller 43 set with the group identifier of the logic group where that host connection device belongs completes, that I/O connection controller 43 notifies the I/O power supply controller 44 connected therewith of the change in the connection status of the system bus and the completion of the setting or cancellation of the interconnection between that host connection controller 33 and that I/O connection controller 43.

When, for example, the I/O connection device 401 receives the above-explained notification from the host connection device 302, the I/O connection controller 43 in the I/O connection device 401 set with the group identifier D sets or cancels the interconnection control with the host connection controller 33 in the host connection device 302. When the setting or cancellation of the interconnection between that host connection controller 33 and the I/O connection controller 43 set with the group identifier D completes, the I/O connection controller 43 set with the group identifier D notifies the I/O power supply controller 44 of the change in the connection status of the host connection 30 and the completion of the setting or cancellation of the interconnection between that host connection controller 33 and the I/O connection controller 43 set with the group identifier D.

The host connection device 301 may also employ a configuration including equal to or greater than two host transfer units 31 and equal to or greater than two host connection controllers 33 like the I/O connection device 401. Accordingly, the host connection device 301 becomes possible to belong to equal to or greater than two logic groups. In the example case illustrated in FIG. 12, the host connection devices 301 and 302 have respective host transfer units 31 and host connection controllers 33 set with group identifiers in such a way that each host connection device belongs to only one logic group.

According to the third embodiment, like the first or second embodiment, each connection device can be set to permit the power linking of each host device or I/O device.

An explanation will be given below of successive operations of changing the power status of other host device or I/O device through the interconnection control and power supply control explained with reference to FIG. 13 and performed by each connection device when the power status of a host device or I/O device in the computer system 1 changes. The operations of the interconnection control and power supply control performed by the connection device according to the third embodiment are the same as those illustrated in FIG. 5. Like the first or second embodiment, each connection device operates in accordance with the flowchart of FIG. 5. Moreover, the operation of the interconnection control performed by the connection device according to the third embodiment is the same as the interconnection control A illustrated in FIG. 6. The operation of the power supply control performed by the connection device according to the third embodiment is the same as the power supply control A illustrated in FIG. 7.

In the following explanation, the operations of the interconnection control and power supply control performed by each connection device and illustrated in FIG. 5, the operation of the interconnection control performed by each connection device and illustrated in FIG. 6, and the operation of the power supply control performed by each connection device and illustrated in FIG. 7 are the same as those of the first embodiment, and when each connection device belongs to multiple logic groups, the I/O transfer unit 41 and the I/O connection controller 43 corresponding to the same logic group, and the host transfer unit 31 and the host connection controller 33 corresponding to the same logic group execute the process.

It is presumed that in the logic group C denoted by number 5 in FIG. 12, the host connection device 301 is set to permit the power linking of the I/O device 204, the I/O connection device 404 is set to permit the power lining of the host device 102, and the host connection device 302 is set to permit the power linking of the I/O device 202. In this case, when the power status of the host device 101 changes, the power statuses of the I/O device 204, the host device 102, and the I/O device 202 change successively.

When the power status of the host device 101 changes, the host connection device 301 detects a change in the connection status of the host connection 30 (steps S101 and S102: DETECTION in FIG. 5), and performs an interconnection control with the I/O connection device 404 (step S104 in FIG. 5, that is, the interconnection control A in FIG. 6) since the power linking with the I/O device 204 is permitted (step S103: YES in FIG. 5). In the interconnection control A illustrated in FIG. 6, the host connection controller 33 in the host connection device 301 notifies the I/O connection controller 43 in the I/O connection device set with the group identifier C of the change in the connection status of the host connection 30 in the host connection device 301 and the setting or cancellation of the interconnection, and sets or cancels the interconnection (step S202 or S204 in FIG. 6). The step S203 is the same as the step S203 in FIG. 6 done by each connection device according to the first embodiment. When the interconnection control A in FIG. 6, that is, the step S104 in FIG. 5 completes, the host connection device 301 returns the process to the step S103, and terminates the interconnection control and power supply control since there is no other power-linking target device than the I/O device 204 (step S103: NO).

Next, an explanation will be given of the operation of the I/O connection device 404 that has received the notification from the host connection device 301 of the change in the connection status of the host connection 30 in the host connection device 301 and the setting or cancellation of the interconnection. The I/O connection device 404 receives the notification from the host connection device 301 of the change in the connection status of the host connection 30 and the setting or cancellation of the interconnection (steps S101 and S102: NOTIFICATION RECEIVED in FIG. 5), and performs a power supply control (step S105 in FIG. 5, that is, the power supply control A in FIG. 7). In the power supply control A in FIG. 7, the I/O connection controller 43 in the I/O connection device 404 set with the group identifier C sets or cancels the interconnection with the host connection controller 33 in the host connection device 301 (step S302 or S305 in FIG. 7). When the setting for the interconnection between that host connection controller 33 and the I/O connection controller 43 in the I/O connection device 404 set with the group identifier C completes, a virtual system bus for the I/O transfer unit 41 in the I/O connection device 404 set with the group identifier C is set (step S303 in FIG. 7).

When the setting or cancellation of the interconnection between the host connection controller 33 in the host connection device 301 and the I/O connection controller 43 in the I/O connection device 404 set with the group identifier C completes, this I/O connection controller 43 notifies the I/O power supply controller 44 connected therewith of the change in the connection status of the host connection 30 and the completion of the setting or cancellation of the interconnection between that host connection controller 33 and the I/O connection controller 43 in the I/O connection device 404 set with the group identifier C. The I/O power supply controller 44 that has received such a notification changes the ON/OFF states of the I/O power supply 20 in the I/O device 204 (step S304 or S306 in FIG. 7). When the power supply control (the power supply control A in FIG. 7, that is, the step S105 in FIG. 5) completes, the I/O connection device 404 returns the process to the step S101 in FIG. 5.

Since the I/O connection device 404 has received the notification from the host connection device 301 of the change in the connection status of the host connection 30 and the setting or cancellation of the interconnection, and the ON/OFF states of the I/O power supply 20 in the I/O device 204 has been changed, the I/O connection device detects a change in the connection status of the I/O connection 40 (steps S101 and S102: DETECTION in FIG. 5). In the connection status change detection operation in the step S101 in FIG. 5, the I/O monitoring unit 42 in the I/O connection device 404 detects the change in the connection status of the I/O connection 40, and notifies the I/O connection controller 43 in the I/O connection device 404 set with a group identifier of a different logic group from the logic group having undergone the above-explained process, that is, the group identifier D of the detected change in the connection status of the I/O connection 40.

With respect to the I/O connection device 404, since the power linking of the host device 102 is permitted in addition to the host device 101 (step S103: YES in FIG. 5), the I/O connection device 404 performs an interconnection control with the host connection device 302 (step S104 in FIG. 5, that is, the interconnection control A in FIG. 6). In the interconnection control A in FIG. 6, the I/O connection controller 43 in the I/O connection device 404 set with the group identifier D notifies the host connection controller 33 in the host connection device 302 of the change in the connection status of the I/O connection 40 and the setting or cancellation of the interconnection, and sets or cancels the interconnection (step S202 or S204 in FIG. 6). When the interconnection between the I/O connection controller 43 in the I/O connection device 404 set with the group identifier D and the host connection controller 33 in the host connection device 302 is set, a virtual system bus for the I/O transfer unit 41 set with the group identifier D is set (step S203 in FIG. 6). When the interconnection control A in FIG. 6, that is, the step S104 in FIG. 5 completes, the I/O connection device 404 returns the process to the step S103 in FIG. 5, and terminates the interconnection control and power supply control since there is no other power-linking permitted device than the host devices 101 and 102 (step S103: NO in FIG. 5).

Next, an explanation will be given of the operation of the host connection device 302 that has received the notification from the I/O connection device 402 of the change in the connection status of the I/O connection 40 and the setting or cancellation of the interconnection. The host connection device 302 receives the notification from the I/O connection device 402 of the change in the connection status of the I/O connection 40 and the setting or cancellation of the interconnection (steps S101 and S102: NOTIFICATION RECEIVED in FIG. 5), and performs a power supply control, thereby changing the ON/OFF states of the host power supply 10 in the host device 102 (step S105 in FIG. 5, that is, the power supply control A in FIG. 7). In the power supply control A in FIG. 7, the host connection controller 33 in the host connection device 302 sets or cancels the interconnection with the I/O connection controller 43 in the I/O connection device 402 set with the group identifier D (step S302 or S305 in FIG. 7). The steps S303, S304, and S306 in FIG. 7 are the same as the steps S303, S304, and S306 in FIG. 7 performed by each connection device according to the first embodiment. When completing the power supply control A in FIG. 7, that is, the step S105 in FIG. 5, the host connection device 302 returns the process to the step S101.

Since the host connection device 302 has received the notification from the I/O connection device 404 of the change in the connection status of the I/O connection 40 and the setting or cancellation of the interconnection, and has changed the ON/OFF states of the host power supply 10 in the host device 102, the host connection device detects a change in the connection status of the host connection 30 in the host connection device 302 (steps S101 and S102: DETECTION in FIG. 5). Since the power linking of the I/O device 202 is permitted (step S103: YES in FIG. 5), the host connection device 302 performs an interconnection control with the I/O connection device 402 like the first embodiment (step S104 in FIG. 5, that is, the interconnection control A in FIG. 6). In FIG. 5, the host connection device 302 terminates the interconnection control and power supply control since there is no other power-linking permitted device than the I/O devices 202 and 204 (step S103: NO in FIG. 5).

Next, an explanation will be given of the operation of the I/O connection device 402 that has received the notification from the host connection device 302 of the change in the connection status of the host connection 30 and the setting or cancellation of the interconnection. The I/O connection device 402 receives the notification from the host connection device 302 of the change in the connection status of the host connection 30 and the setting or cancellation of the interconnection (steps S101 and S102: NOTIFICATION RECEIVED in FIG. 5), and performs a power supply control (step S105 in FIG. 5, that is, the power supply control A in FIG. 7). In FIG. 5, when completing the power supply control (step S105 in FIG. 5), the I/O connection device 402 returns the process to the step S101.

Since the I/O connection device 402 has received the notification from the host connection device 302 of the change in the connection status of the host connection 30 and the setting or cancellation of the interconnection, and has changed the ON/OFF states of the I/O power supply 20 in the I/O device 202, the I/O connection device detects a change in the connection status of the I/O connection 40 (steps S101 and S102: DETECTION). Since there is no other power-linking permitted device than the host device 102 (step S103: NO), the I/O connection device 402 terminates the interconnection control and power supply control.

The computer system 1 may be configured to set a virtual system bus for each transfer unit after the setting for the interconnection between all connection controllers completes. The same is true in the following explanation.

It is presumed that in the logic group C denoted by number 5 in FIG. 12, the I/O connection device 401 is set to permit the power linking of the host device 101 and the host connection device 301 is set to permit the power linking of the I/O device 204, and, the I/O connection device 404 is set to permit the power linking of the host device 102. That is, when the power status of the I/O device 201 changes, the respective power statuses of the host device 101, the I/O device 204, and the host device 102 also change successively.

When the power status of the I/O device 201 changes, the I/O connection device 401 detects a change in the connection status of the I/O connection 40 (steps S101 and S102: DETECTION in FIG. 5), and performs an interconnection control with the host connection device 301 (step S104 in FIG. 5, that is, the interconnection control A in FIG. 6) since the power linking of the host device 101 is permitted (step S103: YES in FIG. 5). In the interconnection control A in FIG. 6, the I/O connection controller 43 in the I/O connection device 401 set with the group identifier C notifies the host connection controller 33 in the host connection device 301 of the change in the connection status of the I/O connection 40 and the setting or cancellation of the interconnection, and sets or cancels the interconnection (step S202 or S204 in FIG. 6). When the setting for the interconnection between the I/O connection controller 43 in the I/O connection device 401 set with the group identifier C and the host connection controller 33 in the host connection device 301 is made, a virtual system bus for the I/O transfer unit 41 in the I/O connection device 401 set with the group identifier C is set (step S203 in FIG. 6). When completing the interconnection control A in FIG. 6, that is, the step S104 in FIG. 5, the I/O connection device 401 returns the process to the step S103, and terminates the interconnection control and power supply control since there is no other power-linking target device than the host device 101 (step S103: NO).

Next, an explanation will be given of the operation of the host connection device 301 that has received the notification from the I/O connection device 401 of the change in the connection status of the I/O connection 40 and the setting or cancellation of the interconnection. The host connection device 301 receives the notification from the I/O connection device 401 of the change in the connection status of the I/O connection 40 and the setting or cancellation of the interconnection (steps S101 and S102: NOTIFICATION RECEIVED in FIG. 5), and performs a power supply control, thereby changing the ON/OFF states of the host power supply 10 in the host device 101 (step S105 in FIG. 5, that is, the power supply control A in FIG. 7). In the power supply control A in FIG. 7, the host connection controller 33 sets or cancels the interconnection with the I/O connection controller 43 in the I/O connection device 401 set with the group identifier C (step S302 or S305 in FIG. 7). The steps S303, S304, and S306 in FIG. 7 are the same as the steps S303, S304, and S306 in FIG. 7 performed by each connection device according to the first embodiment. When completing the power supply control (power supply control A in FIG. 7, that is, the step S105 in FIG. 5), the host connection device 301 returns the process to the step S101 in FIG. 5.

Since the host connection device 301 has received the notification from the I/O connection device 401 of the change in the connection status of the I/O connection 40 and the setting or cancellation of the interconnection, and has changed the ON/OFF states of the host power supply 10 in the host device 101, the host connection device detects a change in the connection status of the host connection 30 (steps S101 and S102: DETECTION in FIG. 5). Since the power linking of the I/O device 204 is permitted (step S103: YES in FIG. 5), the host connection device 301 performs an interconnection control with the I/O connection device 404 (step S104 in FIG. 5, that is, the interconnection control A in FIG. 6). In the interconnection control A in FIG. 6, the host connection controller 33 in the host connection device 301 notifies the I/O connection controller 43 in the I/O connection device 404 set with the group identifier C of the change in the connection status of the host connection 30 and the setting or cancellation of the interconnection, and sets or cancels the interconnection (step S202 or S204 in FIG. 6). The step S203 in FIG. 6 is the same as the step S203 in FIG. 6 performed by each connection device according to the first embodiment. When completing the power supply control A in FIG. 7, that is, the step S105 in FIG. 5, the host connection device 302 returns the process to the step S103, and terminates the interconnection control and power supply control since there is no other power-linking permitted device other than the I/O devices 201 and 204 (step S103: NO).

Next, an explanation will be given of the operation of the I/O connection device 404 that has received the notification from the host connection device 301 of the change in the connection status of the host connection 30 and the setting or cancellation of the interconnection. The I/O connection device 404 receives the notification from the host connection device 301 of the change in the connection status of the host connection 30 and the setting or cancellation of the interconnection (steps S101 and S102: NOTIFICATION RECEIVED in FIG. 5), and performs a power supply control (step S105 in FIG. 5, that is, the power supply control A in FIG. 7). In the power supply control A in FIG. 7, the I/O connection controller 43 in the I/O connection device 404 set with the group identifier C sets or cancels the interconnection with the host connection controller 33 in the host connection device 301 (step S302 or S305 in FIG. 7). When the setting for the interconnection between that host connection controller 33 in the host connection device 301 and the I/O connection controller 43 in the I/O connection device 404 set with the group identifier C is made, a virtual system bus for the I/O transfer unit 41 in the I/O connection device 404 set with the group identifier C is set (step S303 in FIG. 7).

After the completion of the setting or cancellation of the interconnection between the host connection controller 33 in the host connection device 301 and the I/O connection controller 43 in the I/O connection device 404 set with the group identifier C, the I/O connection controller 43 in the I/O connection device 404 set with the group identifier C notifies the I/O power supply controller 44 connected therewith of the change in the connection status of the host connection 30 in the host connection device 301 and the completion of the setting or cancellation of the interconnection between that host connection controller 33 and the I/O connection controller 43 in the I/O connection device 404 set with the group identifier C. The I/O power supply controller 44 that has received such a notification changes the ON/OFF states of the I/O power supply 20 in the I/O device 204 (step S304 or S306 in FIG. 7). When completing the power supply control (the power supply control A in FIG. 7, that is, the step S105 in FIG. 5), the I/O connection device 404 returns the process to the step S101 in FIG. 5.

Since the I/O connection device 404 has received the notification from the host connection device 301 of the change in the connection status of the host connection 30 and the setting or cancellation of the interconnection, and the ON/OFF states of the I/O power supply 20 in the I/O device 204 has been changed, the I/O connection device detects a change in the connection status of the I/O connection 40 (steps S101 and S102: DETECTION in FIG. 5). In the connection status change detection operation in the step S101 in FIG. 5, the I/O monitoring unit 42 in the I/O connection device 404 detects the change in the connection status of the I/O connection 40, and notifies the I/O connection controller 43 in the I/O connection device 404 set with a group identifier of a different logic group from the logic group having undergone the above-explained process, that is, the group identifier D of the detected change in the connection status of the I/O connection 40.

With respect to the I/O connection device 404, since the power linking of the host device 102 is permitted in addition to the host device 101 (step S103: YES in FIG. 5), the I/O connection device 404 performs an interconnection control with the host connection device 302 (step S104 in FIG. 5, that is, the interconnection control A in FIG. 6). In the interconnection control A in FIG. 6, the I/O connection controller 43 in the I/O connection device 404 set with the group identifier D notifies the host connection controller 33 in the host connection device 302 of the change in the connection status of the I/O connection 40 and the setting or cancellation of the interconnection, and sets or cancels the interconnection (step S202 or S204 in FIG. 6). When the interconnection between the I/O connection controller 43 in the I/O connection device 404 set with the group identifier D and the host connection controller 33 in the host connection device 302 is set, a virtual system bus for the I/O transfer unit 41 set with the group identifier D is set (step S203 in FIG. 6). When the interconnection control A in FIG. 6, that is, the step S104 in FIG. 5 completes, the I/O connection device 404 returns the process to the step S103 in FIG. 5, and terminates the interconnection control and power supply control since there is no other power-linking permitted device than the host devices 101 and 102 (step S103: NO).

Next, an explanation will be given of the operation of the host connection device 302 that has received the notification from the I/O connection device 404 of the change in the connection status of the I/O connection 40 and the setting or cancellation of the interconnection. The host connection device 302 receives the notification from the I/O connection device 404 of the change in the connection status of the I/O connection 40 and the setting or cancellation of the interconnection (steps S101 and S102: NOTIFICATION RECEIVED in FIG. 5), and performs a power supply control, thereby changing the ON/OFF states of the host power supply 10 in the host device 102 (step S105 in FIG. 5, that is, the power supply control A in FIG. 7). In the power supply control A in FIG. 7, the host connection controller 33 in the host connection device 302 sets or cancels the interconnection with the I/O connection controller 43 in the I/O connection device 404 set with the group identifier D (step S302 or S305 in FIG. 7). The steps S303, S304, and S306 in FIG. 7 are the same as the steps S303, S304, and S306 in FIG. 7 performed by each connection device according to the first embodiment. When completing the power supply control (the power supply control A in FIG. 7, that is, the step S105 in FIG. 5), the host connection device 302 returns the process to the step S101.

Since the host connection device 302 has received the notification from the I/O connection device 404 of the change in the connection status of the I/O connection 40 and the setting or cancellation of the interconnection, and has changed the ON/OFF states of the host power supply 10 in the host device 102, the host connection device detects a change in the connection status of the host connection 30 (steps S101 and S102: DETECTION). The host connection device 302 terminates the interconnection control and power supply control since there is no other power-linking permitted device than the I/O device 204 (step S103: NO in FIG. 5).

As explained above, according to the computer system 1 according to the third embodiment, the power consumption of the computer system 1 having each host device and I/O device with individual power supply and having each host device with a CPU device and each I/O device with a peripheral device connected over the network 2 through each connection device can be suppressed. Moreover, it becomes possible to prevent the computer system 1 from operating with an incomplete system configuration in which no power is supplied to the CPU devices of some host devices or the peripheral devices of some I/O devices.

Moreover, the computer system 1 according to the third embodiment enables an I/O device to be connected with equal to or greater than two host devices, or a host device to be connected with equal to or greater than two I/O devices. Hence, in comparison with the first or second embodiment, the degree of freedom for the setting and changing of the system configuration improves, and the effective operation of the resource, such as the host device or I/O device, is enabled.

(Fourth Embodiment)

A computer system according to a fourth embodiment of the present invention employs the same configuration as that illustrated in FIG. 12, and a computer system 1 according to the fourth embodiment has, like the third embodiment, a host device or I/O device belonging to equal to or greater than two logic groups.

Figure 14:
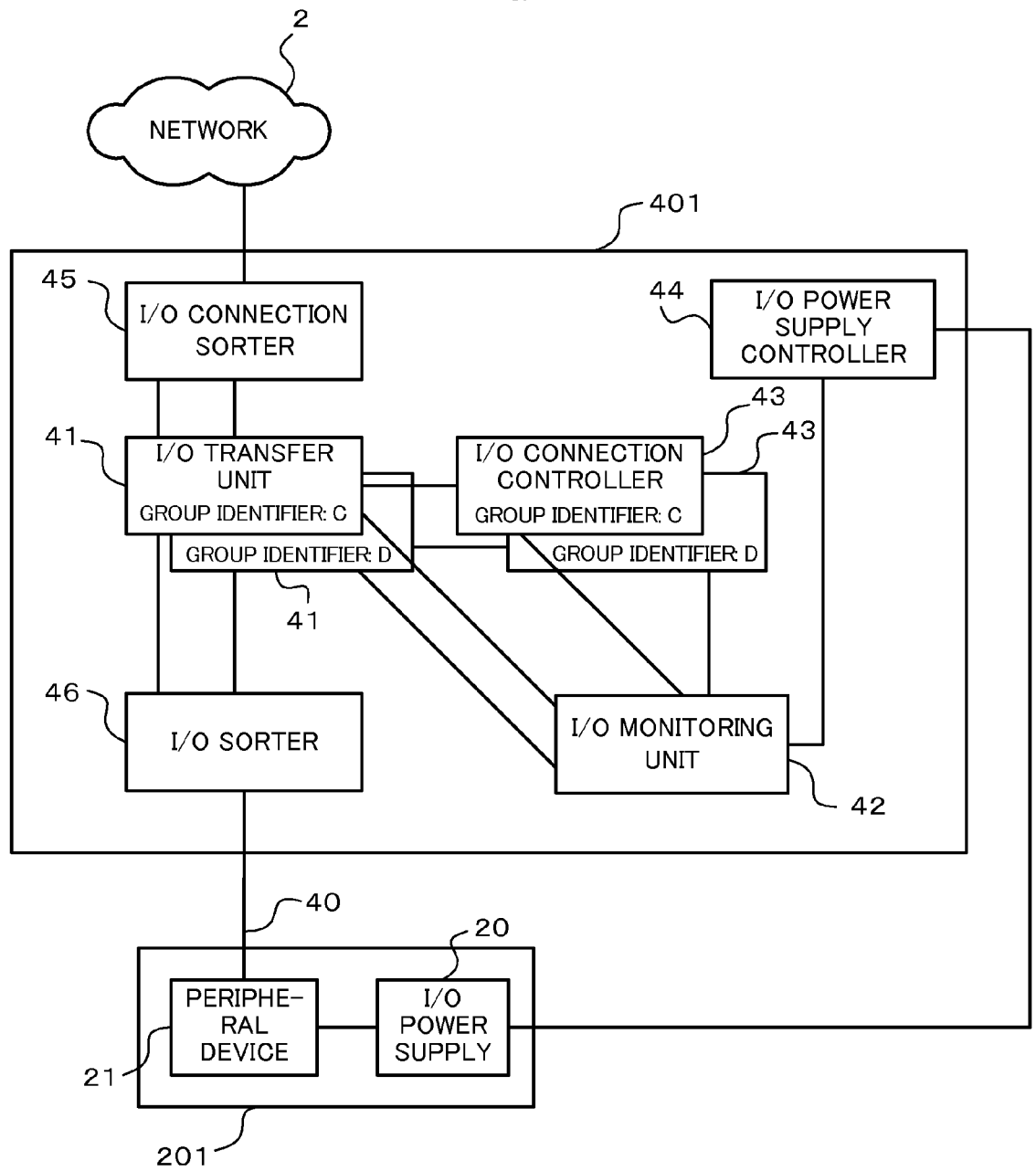
FIG. 14 is a block diagram illustrating an example configuration of an I/O connection device according to a fourth embodiment of the present invention.

In the example case illustrated in FIG. 12, an explanation will be given of the operation of each component of the connection device set with multiple group identifiers with reference to the I/O connection device 401 set with the group identifiers C and D. FIG. 14 is a unit diagram illustrating an example configuration of the I/O connection device according to the fourth embodiment of the present invention. The I/O connection device 401 includes two I/O transfer units 41, the I/O monitoring unit 42, two I/O connection controllers 43, the I/O power supply controller 44, the I/O connection sorter 45 and the I/O sorter 46.

The respective configurations and operations of the I/O connection 40, the I/O connection sorter 45 and the I/O sorter 46 are the same as those of the third embodiment. The operation of the I/O transfer unit 41 is the same as that of the third embodiment, but the I/O transfer unit 41 according to the fourth embodiment is further connected with the I/O monitoring unit 42, and exchanges packets therewith. Moreover, the operation of the I/O power supply controller 44 is the same as that of the third embodiment, but is connected with, not the I/O connection controller 43, but the I/O monitoring unit 42. The respective interconnection relationships between the I/O transfer unit 41, the I/O monitoring unit 42, the I/O connection controller 43, and the I/O power supply controller 44 are the same as those of the second embodiment. The I/O connection device 404 employs the same configuration.

With respect to the interconnection control and power supply control performed by the I/O connection device 401, an explanation will be given of a difference from the third embodiment. A setting for the virtual system bus for the I/O transfer unit 41 is made for each logic group.

Moreover, since there is a host device having a power linking permitted, when the I/O connection device 401 performs an interconnection control, like the third embodiment, the I/O connection controller 43 set with the group identifier of the logic group where that host device belongs notifies the host connection controller 33 connected with that host device of the change in the connection status of the system bus and a setting or cancellation of the interconnection.

When the I/O connection device 401 receives the notification from such a host connection device of the change in the connection status of the system bus and the setting or cancellation of the interconnection, like the third embodiment, the I/O connection controller 43 in the I/O connection device 401 set with the group identifier of the logic group where that host connection device belongs receives the notification of the change in the connection status of the system bus and the setting or cancellation of the interconnection from such a host connection controller 33, and sets or cancels the interconnection with that host connection controller 33.

Like the third embodiment, in the I/O connection devices 402 and 403, the respective I/O transfer units 41 and I/O connection controllers 43 are set with respective group identifiers so as to belong to only the respective one logic groups. As explained in the third embodiment, the host connection device 301 may employ the same configuration as that of the I/O connection device 401. According to the fourth embodiment, in the host connection devices 301 and 302, the respective host transfer units 31 and host connection controllers 33 are set with respective group identifiers so as to belong to only the respective logic groups.

According to the fourth embodiment, like the first, second or third embodiment, each connection device can be set to permit the power linking of each host device or I/O device.

An explanation will be given of successive operations of changing the power status of other host device or I/O device in a linked manner by the interconnection control and power supply control explained with reference to FIG. 14 and performed by each connection device when the power status of a host device or I/O device in the computer system 1 changes. The operations of the interconnection control and power supply control performed by the connection device according to the fourth embodiment are the same as the operations in FIG. 5. Like the first, second or third embodiment, each connection device operates in accordance with the flowchart of FIG. 5. The operation of the interconnection control performed by the connection device according to the fourth embodiment is the same as the interconnection control B illustrated in FIG. 10. The operation of the power supply control performed by the connection device according to the fourth embodiment is the same as the power supply control B illustrated in FIG. 11.

In the following explanation, the operation of interconnection control and power supply control performed by each connection device in FIG. 5, the operation of the interconnection control A performed by each connection device in FIG. 6, and the operation of the power supply control A performed by each connection device in FIG. 7 are the same as those of the second embodiment. When each connection device belongs to multiple logic groups, the I/O transfer unit 41 and the I/O connection controller 43 in the I/O connection device corresponding to the same logic group execute the processes. The order of the change in the power status of each host device or I/O device in accordance with the change in the power status of a host device or I/O device is the same as that of the third embodiment.

Like the third embodiment, it is presumed that in the logic group C denoted by number 5 in FIG. 12, the host connection device 301 is set to permit the power linking of the I/O device 204, the I/O connection device 404 is set to permit the power linking of the host device 102, and the host connection device 302 is set to permit the power linking of the I/O device 202.

When the power status of the host device 101 changes, the host connection device 301 detects a change in the connection status of the host connection 30 in the host connection device 301 (steps S101 and S102: DETECTION in FIG. 5), and performs an interconnection control with the I/O connection device 404 (step S104 in FIG. 5, that is, the interconnection control B in FIG. 10) since the power linking of the I/O device 204 is permitted (step S103: YES in FIG. 5). In the interconnection control B in FIG. 10, the steps S402 and S405 are the same as the steps S402 and S405 in FIG. 10 performed by each connection device according to the second embodiment. The host connection controller 33 in the host connection device 301 notifies the I/O connection controller 43 in the I/O connection device 404 set with the group identifier C of the change in the connection status of the host connection 30 and the setting or cancellation of the interconnection, and sets or cancels the interconnection (step S403 or S406 in FIG. 10). The step S404 in FIG. 10 is the same as the step S404 in FIG. 10 performed by each connection device according to the second embodiment. After the completion of the interconnection control B in FIG. 10, that is, the step S104 in FIG. 5, the host connection device 301 returns the process to the step S103, and terminates the interconnection control and power supply control since there is no other power-linking target device than the I/O device 204 (step S103: NO).

Next, an explanation will be given of the operation of the I/O connection device 404 that has received the notification from the host connection device 301 of the change in the connection status of the host connection 30. The I/O connection device 404 receives the notification from the host connection device 301 of the change in the connection status of the host connection 30 (steps S101 and S102: NOTIFICATION RECEIVED in FIG. 5), and performs a power supply control (step S105 in FIG. 5, that is, the power supply control B in FIG. 11). In the power supply control B in FIG. 11, the steps S502 and S505 are the same as the steps S502 and S505 in FIG. 11 performed by each connection device according to the second embodiment. The I/O connection controller 43 in the I/O connection device 404 set with the group identifier C sets or cancels the interconnection with the host connection controller 33 in the host connection device 301 (step S503 or S506 in FIG. 11). After the setting of the interconnection between the host connection controller 33 and the I/O connection controller 43 in the I/O connection device 404 set with the group identifier C completes, a virtual system bus for the I/O transfer unit 41 in the I/O connection device 404 set with the group identifier C is set (step S504 in FIG. 11). After completing the power supply control (the power supply control B in FIG. 11, that is, the step S105 in FIG. 5), the I/O connection device 404 returns the process to the step S101 in FIG. 5.

Since the I/O connection device 404 has received the notification from the host connection device 301 of the change in the connection status of the host connection 30, and has changed the ON/OFF states of the I/O power supply 20 in the I/O device 204, the I/O connection device detects a change in the connection status of the I/O connection 40 (steps S101 and S102: DETECTION in FIG. 5). In the connection status change detecting operation in the step S101, the I/O monitoring unit 42 in the I/O connection device 404 detects the change in the connection status of the I/O connection 40, and notifies the I/O connection controller 43 in the I/O connection device 404 set with the group identifier of the logic group different from the logic group having undergone the above-explained process, that is, the group identifier D of the detected change in the connection status of the I/O connection 40.

With respect to the I/O connection device 404, since the power linking of the host device 102 is permitted in addition to the host device 101 (step S103: YES in FIG. 5), the I/O connection device 404 performs an interconnection control with the host connection device 302 (step S104 in FIG. 5, that is, the interconnection control B in FIG. 10). In the interconnection control B in FIG. 10, the steps S402 and S405 are the same as the steps S402 and S405 in FIG. 10 performed by each connection device according to the second embodiment. The I/O connection controller 43 in the I/O connection device 404 set with the group identifier D notifies the host connection controller 33 in the host connection device 302 set with the same group identifier D of the change in the connection status of the I/O connection 40 and the setting or cancellation of the interconnection, and sets or cancels the interconnection (step S403 or S406 in FIG. 10). When the interconnection between the I/O connection controller 43 in the I/O connection device 404 set with the group identifier D and the host connection controller 33 in the host connection device 302 is set, a setting for a virtual system bus for the I/O transfer unit 41 in the I/O connection device 404 set with the group identifier D is made (step S404 in FIG. 10). When the interconnection control B in FIG. 10, that is, the step S104 in FIG. 5 completes, the I/O connection device 404 returns the process to the step S103, and terminates the interconnection control and power supply control since there is no other power-linking permitted device than the host devices 101 and 102 (step S103: NO).

Next, an explanation will be given of the operation of the host connection device 302 that has received the notification from the I/O connection device 404 of the change in the connection status of the I/O connection 40. The host connection device 302 receives the notification from the I/O connection device 404 of the change in the connection status of the I/O connection 40 (steps S101 and S102: NOTIFICATION RECEIVED in FIG. 5), and performs a power supply control, thereby changing the ON/OFF states of the host power supply 10 in the host device 102 (step S105 in FIG. 5, that is, the power supply control B in FIG. 11). In the power supply control B in FIG. 11, the steps S502 and S505 are the same as the steps S502 and S505 in FIG. 11 performed by each connection device according to the second embodiment. The host connection controller 33 in the host connection device 302 sets or cancels the interconnection with the I/O connection controller 43 in the I/O connection device 402 set with the group identifier D (step S503 or S506 in FIG. 11). The step S504 in FIG. 11 is the same as the step S504 in FIG. 11 performed by each connection device according to the second embodiment. When completing the power supply control (the power supply control B in FIG. 11, that is, the step S105 in FIG. 5), the host connection device 302 returns the process to the step S101.

Since the host connection device 302 has received the notification from the I/O connection device 404 of the change in the connection status of the I/O connection 40, and the host power supply 10 in the host device 102 has the ON/OFF states changed, the host connection device detects a change in connection status of the host connection 30 (steps S101 and S102: DETECTION in FIG. 5). Since the power linking of the I/O device 202 is permitted (step S103: YES in FIG. 5), the host connection device 302 performs an interconnection control with the I/O connection device 402 (step S104 in FIG. 5, that is, the interconnection control B in FIG. 10). When completing the step S104 in FIG. 5, the host connection device 302 returns the process to the step S103 in FIG. 5, and terminates the interconnection control and power supply control since there is no other power-linking permitted device than the I/O devices 202 and 204 (step S103: NO).

Next, an explanation will be given of the operation of the I/O connection device 402 that has received the notification from the host connection device 302 of the change in the connection status of the host connection 30. The I/O connection device 402 receives the notification from the host connection device 302 of the change in the connection status of the host connection 30 (steps S101 and S102: NOTIFICATION RECEIVED in FIG. 5), and like the second embodiment, performs a power supply control (step S105 in FIG. 5, that is, the power supply control B in FIG. 11). When completing the power supply control (step S105 in FIG. 5, that is, the power supply control B in FIG. 11), the I/O connection device 402 returns the process to the step S101.

Since the I/O connection device 402 has received the notification from the host connection device 302 of the change in the connection status of the host connection 30, and has changed the ON/OFF states of the I/O power supply 20 in the I/O device 202, the I/O connection device detects a change in the connection status of the I/O connection 40 (steps S101 and S102: DETECTION in FIG. 5). Since there is no other power-linking permitted device than the host device 102 (step S103: NO), the I/O connection device 402 terminates the interconnection control and power supply control.

It is presumed that in the logic group C denoted by number 5 in FIG. 12, like the third embodiment, the I/O connection device 401 is set to permit the power linking of the host device 101, the host connection device 301 is set to permit the power linking of the I/O device 204, and the I/O connection device 404 is set to permit the power linking of the host device 102.

When the power status of the I/O device 201 changes, the I/O connection device 401 detects a change in the connection status of the I/O connection 40 (steps S101 and S102: DETECTION in FIG. 5), and performs an interconnection control with the host connection device 301 (step S104 in FIG. 5, that is, the interconnection control B in FIG. 10) since the power linking of the host device 101 is permitted (step S103: YES in FIG. 5). In the interconnection control B in FIG. 10, the steps S402 and S405 are the same as the steps S402 and S405 in FIG. 10 performed by each connection device according to the second embodiment. The I/O connection controller 43 in the I/O connection device 401 set with the group identifier C notifies the host connection controller 33 in the host connection device 301 of the change in the connection status of the I/O connection 40 and the setting or cancellation of the interconnection, thereby setting or cancelling the interconnection (step S403 or S406 in FIG. 10). When the setting for the interconnection between the I/O connection controller 43 in the I/O connection device 401 set with the group identifier C and the host connection controller 33 is made, a virtual system bus for the I/O transfer unit 41 in the I/O connection device 401 set with the group identifier C is set (step S404 in FIG. 10). When completing the interconnection control B in FIG. 10, that is, the step S104 in FIG. 5, the I/O connection device 401 returns the process to the step S103 in FIG. 5, and terminates the interconnection control and power supply control since there is no other power-linking target device than the host device 101 (step S103: NO).

Next, an explanation will be given of the operation of the host connection device 301 that has received the notification from the I/O connection device 401 of the change in the connection status of the I/O connection 40. The host connection device 301 receives the notification from the I/O connection device 401 of the change in the connection status of the I/O connection 40 (steps S101 and S102: NOTIFICATION RECEIVED in FIG. 5), and performs a power supply control, thereby changing the ON/OFF states of the host power supply 10 in the host device 101 (step S105 in FIG. 5, that is, the power supply control B in FIG. 11). In the power supply control B in FIG. 11, the steps S502 and S505 are the same as the step S502 and S505 in FIG. 11 performed by each connection device according to the second embodiment. The host connection controller 33 in the host connection device 301 sets or cancels the interconnection with the I/O connection controller 43 in the I/O connection device 401 set with the group identifier C (step S503 or S506 in FIG. 11). The step S504 in FIG. 11 is the same as the step S504 in FIG. 11 performed by each connection device according to the second embodiment. When completing the power supply control (the power supply control B in FIG. 11, that is, the step S105 in FIG. 5), the host connection device 301 returns the process to the step S101 in FIG. 5.

Since the host connection device 301 has received the notification from the I/O connection device 401 of the change in the connection status of the I/O connection 40, and has changed the ON/OFF states of the host power supply 10 in the host device 101, the host monitoring unit 32 in the host connection device 301 detects a change in the connection status of the host connection 30 (steps S101 and S102: DETECTION in FIG. 5). Since the power linking of the I/O device 204 is permitted (step S103: YES in FIG. 5), the host connection device 301 performs an interconnection control with the I/O connection device 404 (step S104 in FIG. 5, that is, the interconnection control B in FIG. 10). In the interconnection control B in FIG. 10, the steps S402 and S405 are the same as the steps S402 and S405 in FIG. 10 performed by each connection device according to the second embodiment. The host connection controller 33 in the host connection device 301 notifies the I/O connection controller 43 in the I/O connection device 404 set with the group identifier C of the change in the connection status of the host connection 30 and the setting or cancellation of the interconnection, and sets or cancels the interconnection (step S403 or S406 in FIG. 10). The step S404 in FIG. 10 is the same as the step S404 in FIG. 10 performed by each connection device according to the second embodiment. When completing the interconnection control B in FIG. 10, that is, the step S104 in FIG. 5, the host connection device 301 returns the process to the step S103, and terminates the interconnection control and power supply control since there is no other power-linking permitted device other than the I/O devices 202 and 204 (step S103: NO).

Next, an explanation will be given of the operation of the I/O connection device 404 that has received the notification from the host connection device 301 of the change in the connection status of the host connection 30. The I/O connection device 404 receives the notification from the host connection device 301 of the change in the connection status of the host connection 30 (steps S101 and S102: NOTIFICATION RECEIVED in FIG. 5), and performs a power supply control (step S105 in FIG. 5, that is, the power supply control B in FIG. 11). In the power supply control B in FIG. 11, the steps S502 and S505 are the same as the steps S502 and S505 in FIG. 11 performed by each connection device according to the second embodiment. The I/O connection controller 43 in the I/O connection device 404 set with the group identifier C sets or cancels the interconnection with the host connection controller 33 in the host connection device 301 (step S503 or S506 in FIG. 11). When the setting for the interconnection between that host connection controller 33 and the I/O connection controller 43 in the I/O connection device 404 set with the group identifier C is made, a virtual system bus for the I/O transfer unit 41 in the I/O connection device 404 set with the group identifier C is set (step S504 in FIG. 11). After completing the power supply control (the power supply control B in FIG. 11, that is, the step S105 in FIG. 5), the I/O connection device 404 returns the process to the step S101.

Since the I/O connection device 404 has received the notification from the host connection device 301 of the change in the connection status of the host connection 30, and has changed the ON/OFF states of the I/O power supply 20 in the I/O device 204, the I/O connection device detects a change in the connection status of the I/O connection 40 (steps S101 and S102: DETECTION in FIG. 5). In the connection status detecting operation in the step S101 in FIG. 5, the I/O monitoring unit 42 of the I/O device 204 detects the change in the connection status of the I/O connection 40, and notifies the I/O connection controller 43 in the I/O device 204 set with the group identifier of the different logic group from the logic group subjected to the above-explained process, that is, the group identifier D of the detected change in the connection status of the I/O connection 40.

With respect to the I/O connection device 404, since the power linking of the host device 102 is permitted in addition to the host device 101 (step S103: YES), the I/O connection device 404 performs an interconnection control with the host connection device 302 (step S104 in FIG. 5, that is, the interconnection control B in FIG. 10). In the interconnection control B in FIG. 10, the I/O monitoring unit 42 in the I/O connection device 404 notifies the host monitoring unit 32 in the host connection device 302 of the change in the connection status of the host connection 30 (step S402 or S405 in FIG. 10). The I/O connection controller 43 in the I/O connection device 404 set with the group identifier D notifies the host connection controller 33 in the host connection device 302 of the change in the connection status of the I/O connection 40 and the setting or cancellation of the interconnection, and sets or cancels the interconnection (step S403 or S406 in FIG. 10). When the interconnection between the I/O connection controller 43 in the I/O connection device 404 set with the group identifier D and the host connection controller 33 in the host connection device 302 is set, a setting for a virtual system bus for the I/O transfer unit 41 in the I/O connection device 404 set with the group identifier D is made (step S404 in FIG. 10). When the interconnection control A in FIG. 10, that is, the step S104 in FIG. 5 completes, the I/O connection device 404 returns the process to the step S103, and terminates the interconnection control and power supply control since there is no other power-linking permitted device than the host devices 101 and 102 (step S103: NO).

Next, an explanation will be given of the operation of the host connection device 302 that has received the notification from the I/O connection device 404 of the change in the connection status of the I/O connection 40. The host connection device 302 receives the notification from the I/O connection device 404 of the change in the connection status of the I/O connection 40 (steps S101 and S102: NOTIFICATION RECEIVED in FIG. 5), and performs a power supply control, thereby changing the ON/OFF states of the host power supply 10 in the host device 102 (step S105 in FIG. 5, that is, the power supply control B in FIG. 11). In the power supply control B in FIG. 11, the steps S502 and S505 are the same as the steps S502 and S505 in FIG. 11 performed by each connection device according to the second embodiment. The host connection controller 33 in the host connection device 302 sets or cancels the interconnection with the I/O connection controller 43 in the I/O connection device 404 set with the group identifier D (step S503 or S506 in FIG. 11). The step S504 in FIG. 11 is the same as the step S504 in FIG. 11 performed by each connection device according to the second embodiment. When completing the power supply control (the power supply control B in FIG. 11, that is, the step S105 in FIG. 5), the host connection device 302 returns the process to the step S101 in FIG. 5.

Since the host connection device 302 has received the notification from the I/O connection device 404 of the change in the connection status of the I/O connection 40, and has changed the ON/OFF states of the host power supply 10 in the host device 102, the host connection device detects a change in the connection status of the host connection 30 (steps S101 and S102: DETECTION in FIG. 5). The host connection device 302 terminates the interconnection control and power supply control since there is no other power-linking permitted device than the I/O device 204 (step S103: NO in FIG. 5).

As explained above, according to the computer system 1 according to the fourth embodiment, the power consumption of the computer system 1 having each host device and I/O device with individual power supply and having each host device with a CPU device and each I/O device with a peripheral device connected over the network 2 through each connection device can be suppressed. Moreover, it becomes possible to prevent the computer system 1 from operating with an incomplete system configuration in which no power is supplied to the CPU devices of some host devices or the peripheral devices of some I/O devices.

Moreover, the computer system 1 according to the fourth embodiment enables an I/O device to be connected with equal to or greater than two host devices, or a host device to be connected with equal to or greater than two I/O devices. Hence, in comparison with the first or second embodiment, the degree of freedom for the setting and changing of the system configuration improves, and the effective operation of the resource, such as the host device or I/O device, is enabled.

Still further, the computer system 1 according to the fourth embodiment performs a power supply control without waiting for the completion of the setting or cancellation of the interconnection between the connection devices, and thus the power supply control on each host device or I/O device in the computer system 1 can be performed at a faster speed than the third embodiment. When, for example, some peripheral devices in the computer system 1 need a longer time for startup than other peripheral devices, if the connection device according to the second embodiment is applied to some connection devices, the whole computer system 1 becomes operable at a faster speed.

The embodiments of the present invention are not limited to the above-explained embodiments, and can be an arbitral combination of the multiple embodiments among the above-explained embodiments.

The network standard may be other than the Ethernet (registered trademark). The connection standard of the host connection 30 and the I/O connection 40 may be other than the PCIe (registered trademark). Moreover, equal to or greater than two host devices may be configured to belong to a logic group. For example, a computer system or the like having an on-line system and a stand-by system is the example of such a configuration.

Figure 15:
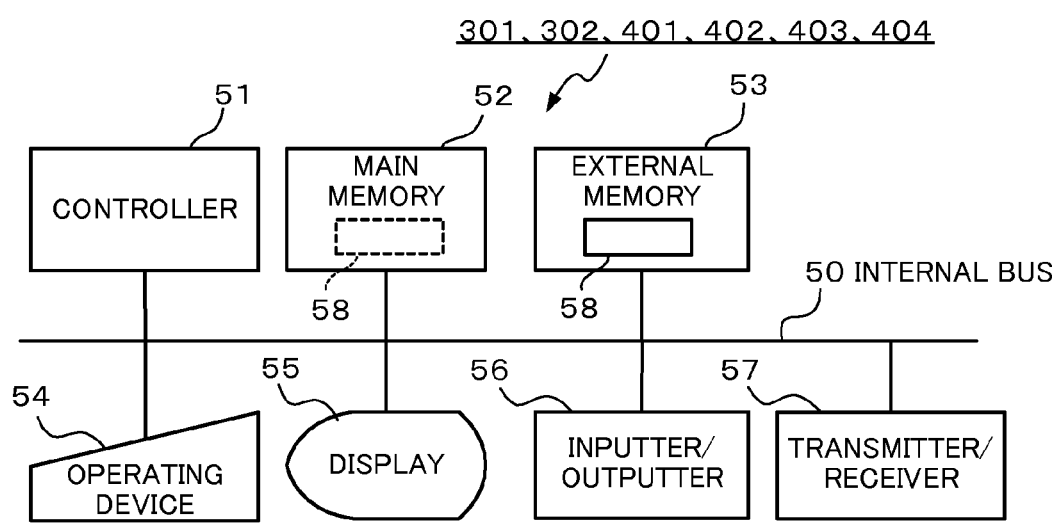
FIG. 15 is a block diagram illustrating an example physical configuration of a computer system and that of a connection device according to an embodiment of the present invention.

FIG. 15 is a block diagram illustrating an example physical configuration of a connection device according to an embodiment of the present invention. As illustrated in FIG. 15, each connection device includes a controller 51, a main memory 52, an external memory 53, an operating device 54, a display 55, an inputter/outputter 56, and a transmitter/receiver 57. The main memory 52, the external memory 53, the operating device 54, the display 55, the inputter/outputter 56 and the transmitter/receiver 57 are all connected with the controller 51 via an internal bus 50.

The controller includes, for example, a CPU (Central Processing Unit), and executes an interconnection control and a power supply control performed by each connection device in accordance with a control program 58 stored in the external memory 53.

The main memory 52 includes, for example, a RAM (Random-Access Memory), loads therein the control program 58 stored in the external memory 53, and is utilized as a work area for the controller 51.

The external memory 53 includes a non-volatile memory like a flash memory, stores in advance the control program 58 for causing the controller 51 to execute the above-explained processes, supplies data stored by the control program 58 to the controller 51 in accordance with the instruction therefrom, and stores data supplied from the controller 51.

The operating device 54 includes pointing devices, such as a switch and a touch panel, and an interface device that connects the pointing devices and the like with the internal bus 50. A setting for and a change in a power supply control table stored in the connection device are received through the operating device 54.

The display 55 includes, for example, an LCD (Liquid Crystal Display) or an organic EL display, a speaker, and an LED lamp, and displays, for example, each host device or I/O device having the power linking permitted and being set in each connection device.

The inputter/outputter 56 includes a serial interface or a parallel interface. Each host device or I/O device and the power source are connected with the inputter/outputter 56.

The transmitter/receiver 57 includes a wireless transmitter/receiver, a wireless modem or a network termination device, and a serial interface or a LAN (Local Area Network) interface connected therewith.

The processes by a transfer processor, a link monitoring unit, an interconnection controller, a power supply controller, a connection sorter, and a sorter in each connection device are executed by the controller 51 which utilizes, as resources, the main memory 52, the external memory 53, the operating device 54, the display 55, the inputter/outputter 56, the transmitter/receiver 57, and the like to execute the control program 58.

In addition to the above explanation, the above-explained hardware configurations and flowcharts are merely examples, and can be changed and modified as needed.

The central portion configured by the controller 51, the main memory 52, the external memory 53, the internal bus 50, and the like and executing the control processes can be realized by not an exclusive system but a normal computer system. Each connection device executing the above-explained process may be configured by, for example, storing the control program for executing the above-explained operations in a computer-readable recording medium (for example, a flexible disk, a CD-ROM, or a DVD-ROM), distributing such a recording medium, and installing the control program in a computer. Moreover, the above-explained control program may be stored in a memory device of a server device over a communication network like the Internet, and a normal computer system may download or the like such a program, thereby configuring each connection device.

When, for example, the functions of each connection device are realized by an assignation of an OS (operating system) and an application program, or a cooperative work by the OS and the application program, only the application program may be stored in a computer-readable recording medium or a memory device.

Moreover, by superimposing the control program on carrier waves, and by distributing such carrier waves to each connection device over a communication network, each connection device can be configured. For example, the above-explained control program is posted on a bulletin board (BBS: Bulletin Board System) over the communication network, and the control program is distributed to each connection device over the network. Next, each connection device launches this control program, and executes such a program like other application programs under the control of the OS, thereby being configured so as to execute the above-explained processes.

Some of or all of the above-explained embodiments can be expressed as the following additional notes, but the present invention is not limited to the following additional notes.

(Additional Note 1)

A connection device which is connected with a host device including a CPU device and an individual power supply, or an I/O device including a peripheral device and an individual power supply via a system bus, and which connects the host device or the I/O device to a network, the connection device including:

connection status monitoring means that detects a change in a connection status of the system bus connected with the host device or the I/O device;

connection status notifying means that notifies another connection device connected with the network and set in advance of the change in the connection status of the system bus detected by the connection status monitoring means;

interconnection control means that sets or cancels an interconnection with the another connection device set in advance based on the change in the connection status of the system bus detected by the connection status monitoring means;

transfer process means that enables a virtual system bus transfer of data in the system bus connected with the host device or the I/O device transferred over the network with the interconnection set with the another connection device by the interconnection control means being as a virtual system bus; and power supply control means that changes ON/OFF states of the power supply of the connected host device or I/O device when receiving the notification from the another connection device of the change in the connection status of the system bus.

(Additional Note 2)

The connection device described in additional note 1, in which the interconnection control means sets or cancels an interconnection with the connection device connected with the at least one I/O device when the connection device is connected with the host device, and the interconnection control means sets or cancels an interconnection with the connection device connected with the at least one host device when the connection device is connected with the I/O device, the transfer process means sets an interconnection with the connection device connected with the at least one I/O device to enable the virtual system bus transfer when the connection device is connected with the host device, and the transfer process means sets an interconnection with the connection device connected with the at least one host device to enable the virtual system bus transfer when the connection device is connected with the I/O device.

(Additional Note 3)

The connection device described in additional note 1 or 2, in which the power supply control means waits for a completion of the setting or cancellation of the interconnection with the another connection device, and performs a power supply control on the power supply connected with the connection device.

(Additional Note 4)

A computer system including:
the at least one host device;
the at least one I/O device; and
the equal to or greater than two connection devices each of which is connected with the host device and the I/O device via the system bus, connects each of the host device and the I/O device to the network, and described in additional note 1 or 2.

(Additional Note 5)

The computer system described in additional note 4, in which the power supply control means of the at least one connection device waits for a completion of the setting or cancellation of the interconnection with the another connection device, and performs a power supply control on the power supply connected with the connection device.

(Additional Note 6)

A power supply control method executed by a connection device which is connected with a host device including a CPU device and an individual power supply, or an I/O device including a peripheral device and an individual power supply via a system bus, and which connects the host device or the I/O device to a network, the power supply control method including:

a connection status monitoring step for detecting a change in a connection status of the system bus connected with the host device or the I/O device;

a connection status notifying step for notifying another connection device connected with the network and set in advance of the change in the connection status of the system bus detected through the connection status monitoring step;

an interconnection control step for setting or canceling an interconnection with the another connection device set in advance based on the change in the connection status of the system bus detected through the connection status monitoring step;

a transfer process step for enabling a virtual system bus transfer of data in the system bus connected with the host device or the I/O device transferred over the network with the interconnection set with the another connection device through the interconnection control step being as a virtual system bus; and a power supply control step for changing ON/OFF states of the power supply of the connected host device or I/O device when receiving the notification from the another connection device of the change in the connection status of the system bus.

(Additional Note 7)

The power supply control method described in additional note 6, in which in the interconnection control step, an interconnection with the connection device connected with the at least one I/O device is set or canceled when the connection device is connected with the host device, or an interconnection with the connection device connected with the at least one host device is set or canceled when the connection device is connected with the I/O device, and in the transfer process step, an interconnection with the connection device connected with the at least one I/O device is set to enable the virtual system bus transfer when the connection device is connected with the host device, or an interconnection with the connection device connected with the at least one host device is set to enable the virtual system bus transfer when the connection device is connected with the I/O device.

(Additional Note 8)

The power supply control method described in additional note 6 or 7, in which in the power supply control step, a completion of the setting or cancellation of the interconnection with the another connection device is waited, and a power supply control on the power supply connected with the connection device is performed.

(Additional Note 9)

A recording medium of a power supply control program in a computer-readable manner, the power supply control program causing a connection device which is connected with a host device including a CPU device and an individual power supply, or an I/O device including a peripheral device and an individual power supply via a system bus, and which connects the host device or the I/O device to a network to execute:

a connection status monitoring step for detecting a change in a connection status of the system bus connected with the host device or the I/O device;

a connection status notifying step for notifying another connection device connected with the network and set in advance of the change in the connection status of the system bus detected through the connection status monitoring step;

an interconnection control step for setting or canceling an interconnection with the another connection device set in advance based on the change in the connection status of the system bus detected through the connection status monitoring step;

a transfer process step for enabling a virtual system bus transfer of data in the system bus connected with the host device or the I/O device transferred over the network with the interconnection set with the another connection device through the interconnection control step being as a virtual system bus; and a power supply control step for changing ON/OFF states of the power supply of the connected host device or I/O device when receiving the notification from the another connection device of the change in the connection status of the system bus.

(Additional Note 10)

The recording medium of the power supply control program described in additional note 9, in which in the interconnection control step, when the connection device is connected with the host device, an interconnection with the connection device connected with the at least one I/O device is set or canceled, or when the connection device is connected with the I/O device, an interconnection with the connection device connected with the at least one host device is set or canceled, and in the transfer process step, when the connection device is connected with the host device, an interconnection with the connection device connected with the at least one I/O device is set to enable the virtual system bus transfer, or when the connection device is connected with the I/O device, an interconnection with the connection device connected with the at least one host device is set to enable the virtual system bus transfer.

(Additional Note 11)

The recording medium of the power supply control program described in additional note 9 or 10, in which in the power supply control step, a completion of the setting or cancellation of the interconnection with the another connection device is waited, and a power supply control on the power supply connected with the connection device is performed.

This application claims the benefit of priority based on Japanese Patent Application No. 2011-128685 filed on Jun. 8, 2011. The whole disclosure of the specification, claims, and drawings of Japanese Patent Application No. 2011-128685 are herein incorporated in this specification by reference.

REFERENCE SIGNS LIST

1 Computer system
2 Network
3 Logic group A
4 Logic group B
5 Logic group C
6 Logic group D
10 Host power supply
11, 12 CPU device
20 I/O power supply
21, 22, 23, 24 Peripheral device
30 Host connection
31 Host transfer unit
32 Host monitoring unit
33 Host connection controller
34 Host power supply controller
40 I/O connection
41 I/O transfer unit
42 I/O monitoring unit
43 I/O connection controller
44 I/O power supply controller
45 I/O connection sorter
46 I/O sorter
50 Internal bus
51 Controller
52 Main memory
53 External memory
54 Operating device
55 Display
56 Inputter/outputter
57 Transmitter/receiver
58 Control program
101, 102 Host device
201, 202, 203, 204 I/O device
301, 302 Host connection device
401, 402, 403, 404 I/O connection device

What is claimed is:

1. A connection device for connecting either one of target devices to a network via a system bus, the target devices being defined as a host device including a CPU device and an individual power supply, and an I/O device including a peripheral device and an individual power supply via a system bus, and which connects the host device or the I/O device to a network, the connection device comprises:

a central processing unit;
a memory that stores a control program and is used for processing by the central processing unit;
an inputter/outputter that inputs/outputs information and is connected with the target devices including power supplies via the system bus;
a transmitter/receiver that transmits/receives information to/from another connection device and is connected to the network via the system bus;
an internal bus that connects the central processing unit to the memory, the inputter/outputter, and the transmitter/receiver;

a connection status monitoring portion, a connection status notifying portion, an interconnection control portion, and a transfer process portion that are functional portions whose function is attained by the central processing unit reading the control program from the memory, and executing the control program by using the memory, the inputter/outputter, and the transmitter/receiver;

wherein the connection status monitoring portion is configured to detect a change in a connection status of the system bus connected with the either one of target devices the connection status notifying portion is configured to notify at least another connection device connected with the network and set in advance of the change in the connection status of the system bus detected by the connection status monitoring portion;

the interconnection control portion is configured to set or cancel an interconnection with the at least another connection device set in advance based on the change in the connection status of the system bus detected by the connection status monitoring portion;

the transfer process portion is configured to enable a virtual system bus transfer of data in the system bus connected with either one of the target devices over the network, the virtual system bus being between the transfer process portion and the at least another connection device to which the interconnection is set by the interconnection control portion; and the power supply control portion is configured to change ON/OFF states of the power supply of the connected either one of target devices when receiving the notification from the at least another connection device of the change in the connection status of the system bus.

2. The connection device according to claim 1, wherein the interconnection control portion of the connection device when the either one of target devices is the host device is configured to set or cancel an interconnection with at least another connection device for connecting the I/O device to the network, and alternatively and the interconnection control portion of the connection device when the either on of target devices is the I/O device is configured to set or cancel an interconnection with at least another connection device for connecting the host device to the network the transfer process portion of the connection device when the either one of target devices is the host device is configured to set an interconnection with at least another connection device for connecting the I/O device to the network to enable the virtual system bus transfer, and alternatively the transfer process portion of the connection device when the either one of target devices is the I/o device is configured to set an interconnection with at least another connection device for connecting the host device to the network to enable the virtual bus transfer.

3. The connection device according to claim 1, wherein the power supply control portion is configured to wait for a completion of the setting or cancellation of the interconnection with the all other connection devices, and perform a power supply control on the power supply connected with the connection device.

4. A computer system comprising:
the at least one host device;
the at least one I/O device; and
at least one of connection device for each of two cases (i) when the either one of target devices is the host device and (ii) when the either one of target devices is the I/O device, each connection device comprising:
a central processing unit;
a memory that stores a control program and is used for processing by the central processing unit;
an inputter/outputter that inputs/outputs information and is connected with the target devices including power supplies via the system bus;
a transmitter/receiver that transmits/receives information to/from another connection device and is connected to the network via the system bus;
an internal bus that connects the central processing unit to the memory, the inputter/outputter, and the transmitter/receiver;
a connection status monitoring portion, a connection status notifying portion, an interconnection control portion, and a transfer process portion that are functional portions whose function is attained by the central processing unit reading the control program from the memory, and executing the control program by using the memory, the inputter/outputter, and the transmitter/receiver;

wherein the connection status monitoring portion is configured to detect a change in a connection status of the system bus connected with the either one of target devices;

the connection status notifying portion is configured to notify at least another connection device connected with the network and set in advance of the change in the connection status of the system bus detected by the connection status monitoring portion;

the interconnection control portion is configured to set or cancel an interconnection with the at least another connection device set in advance based on the change in the connection status of the system bus detected by the connection status monitoring portion;

the transfer process portion is configured to enable a virtual system bus transfer of data in the system bus connected with either one of the target devices over the network, the virtual system bus being between the transfer process portion and the at least another connection device to which the interconnection is set by the interconnection control portion; and the power supply control portion is configured to change ON/OFF states of the power supply of the connected either one of target devices when receiving the notification from the at least another connection device of the change in the connection status of the system bus.

5. The computer system according to claim 4, wherein the power supply control portion of the at least one connection device is configured to wait for a completion of the setting or cancellation of the interconnection with the all other connection devices, and performs a power supply control on the power supply connected with the connection device.

6. A power supply control method executed by a connection device for connecting either one of target devices to a network via a system bus, the target devices being defined as a host device including a CPU device and an individual power supply, and an I/O device including a peripheral device and an individual power supply the power supply control method comprising:

detecting a change in a connection status of the system bus connected with either one of the target devices;

notifying at least another connection device connected with the network and set in advance of the detected change in the connection status of the system bus;

setting or canceling an interconnection with the at least another connection device set in advance based on the detected change in the connection status of the system bus;

enabling a virtual system bus transfer of data in the system bus connected with the either one of target devices over the network, the virtual system bus being between the transfer process portion and the another connections device to which the interconnection is set and changing ON/OFF states of the power supply of the connected either one of the target devices when receiving the notification from the at least another connection device of the change in the connection status of the system bus.

7. The power supply control method according to claim 6, wherein in the process of setting or canceling the interconnection the connection device when either one of the target devices is the host device sets or cancels an interconnection with at least another connection device for connecting the I/O device to the network, and alternatively the connection device when the either one of the target devices is the I/O device sets or cancels the interconnection with at least another connection devices for connecting the host device to the network in the process of enabling the virtual system bus transfer of the data, the connection device when either one of the target devices is the host device sets the interconnection with at least another connection devices for connecting the I/O device to the network to enable the virtual system bus transfer, and alternatively the connecting device when the either one of the target devices is the I/O device sets the interconnection with at least one of the other connection devices for connecting the host device to the network to enable the virtual system bus transfer.

8. The power supply control method according to claim 6, wherein in the process of changing ON/OFF states of the power supply, a completion of the setting or cancellation of the interconnection with the all other connection devices is waited, and a power supply control on the power supply connected with the connection device is performed.

9. A recording non-transitory medium of a power supply control program in a computer-readable manner, the power supply control program causing a connection device having computer functions for connecting either one of target devices to a network via a system bus, the target devices being defined as a host device including a CPU device and an individual power supply, and an I/O device including a peripheral device and an individual power supply to execute:

detecting a change in a connection status of the system bus connected with the either one of the target devices;

notifying at least another connection device connected with the network and set in advance of the detected change in the connection status of the system bus;

setting or canceling an interconnection with the at least another connection device set in advance based on the detected change in the connection status of the system bus;

enabling a virtual system bus transfer of data in the system bus connected with the either one of target devices over the network, the virtual system bus being between the transfer process portion and the at least another connections device to which the interconnection is set; and changing ON/OFF states of the power supply of the connected either one of the target devices when receiving the notification from the at least another connection device of the change in the connection status of the system bus.

* * * * *